(12) United States Patent
Stone et al.

(10) Patent No.: US 11,797,638 B2
(45) Date of Patent: Oct. 24, 2023

(54) AGGREGATE COMPONENT FOR PARALLEL BROWSER-INITIATED ACTIONS

(71) Applicant: salesforce.com, inc., San Francisco, CA (US)

(72) Inventors: David Stone, Oakland, CA (US); Daniel S. Kim, San Francisco, CA (US); Jun Gao, Foster City, CA (US)

(73) Assignee: salesforce.com, inc.

( * ) Notice: Subject to any disclaimer, the term of this patent is extended or adjusted under 35 U.S.C. 154(b) by 281 days.

(21) Appl. No.: 17/249,240

(22) Filed: Feb. 24, 2021

(65) Prior Publication Data

US 2022/0269738 A1    Aug. 25, 2022

(51) Int. Cl.
| | |
|---|---|
| *G06F 16/958* | (2019.01) |
| *G06F 3/0482* | (2013.01) |
| *G06F 8/34* | (2018.01) |
| *G06F 8/38* | (2018.01) |
| *G06F 3/0486* | (2013.01) |

(52) U.S. Cl.
CPC .......... *G06F 16/958* (2019.01); *G06F 3/0482* (2013.01); *G06F 8/34* (2013.01); *G06F 8/38* (2013.01); *G06F 3/0486* (2013.01)

(58) Field of Classification Search
CPC . G06F 8/34; G06F 8/38; G06F 3/0482; G06F 3/0481; G06F 3/0486; G06F 16/958
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

FOREIGN PATENT DOCUMENTS

CA    2720114 A1    10/2009

OTHER PUBLICATIONS

David Stone, et al, Process Flow Builder for User-Configurable Web Component Sequences, U.S. Appl. No. 17/248,607, filed Jan. 29, 2021.

*Primary Examiner* — Wei Y Zhen
*Assistant Examiner* — Amir Soltanzadeh
(74) *Attorney, Agent, or Firm* — Lorenz & Kopf, LLP

(57) ABSTRACT

Database systems and methods are provided for visual design and customization of processes for web applications. A method involves identifying a plurality of configured actions added to an aggregate action component region on a graphical user interface (GUI) display, automatically generating configured code for each of the configured actions in accordance with a respective user configuration of the respective configured action, identifying a user configuration associated with the aggregate action component, automatically generating aggregate action component code configurable to cause a browser application to initiate the configured code for each of the configured actions in parallel in accordance with the user configuration, and automatically generating process flow code including a reference to the aggregate action component code in accordance with a sequence defined for a web page.

17 Claims, 16 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,896,035 B1 | 1/2021 | Abdulhayoglu |
| 11,561,772 B2 * | 1/2023 | Levitt ............... G06F 8/44 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0136320 A1 | 6/2007 | Sah et al. |
| 2007/0162845 A1 | 7/2007 | Cave et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0169755 A1 | 7/2010 | Zafar et al. |
| 2011/0023017 A1 | 1/2011 | Calvin |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0290955 A1 | 11/2012 | Quine |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0258836 A1 | 9/2014 | Horton et al. |
| 2014/0258837 A1 | 9/2014 | Horton et al. |
| 2015/0012818 A1 | 1/2015 | Reichmann et al. |

(56) References Cited

U.S. PATENT DOCUMENTS

| | | |
|---|---|---|
| 2015/0020006 A1 | 1/2015 | Kotzer |
| 2015/0212989 A1 | 7/2015 | Rice |
| 2016/0070813 A1* | 3/2016 | Unter Ecker ......... G06F 16/958 |
| | | 715/234 |
| 2016/0092176 A1 | 3/2016 | Straub et al. |
| 2016/0358354 A1 | 12/2016 | Alli et al. |
| 2017/0103044 A1 | 4/2017 | Baldwin et al. |
| 2017/0351656 A1 | 12/2017 | Lysanov |
| 2018/0075250 A1 | 3/2018 | Chasman et al. |
| 2019/0235984 A1 | 8/2019 | Joshi et al. |
| 2020/0089524 A1* | 3/2020 | Nelson ................. G06F 40/169 |
| 2020/0097161 A1 | 3/2020 | Gonzalez et al. |
| 2020/0372206 A1 | 11/2020 | Fialkow et al. |
| 2020/0394028 A1 | 12/2020 | Byrne et al. |
| 2021/0216190 A1 | 7/2021 | Vakil et al. |
| 2021/0405982 A1 | 12/2021 | Douglas et al. |

\* cited by examiner

US 11,797,638 B2

AGGREGATE COMPONENT FOR PARALLEL BROWSER-INITIATED ACTIONS

TECHNICAL FIELD

One or more implementations relate to the field of database systems, and more specifically, to declarative, drag and drop customizations of data-driven applications.

BACKGROUND

Modern software development has evolved towards web applications or cloud-based applications that provide access to data and services over the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware.

Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features. However, creating customizations can be difficult and time-consuming for users who are relatively inexperienced with computer programming or are otherwise unfamiliar with the platform(s) of the multi-tenant system.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
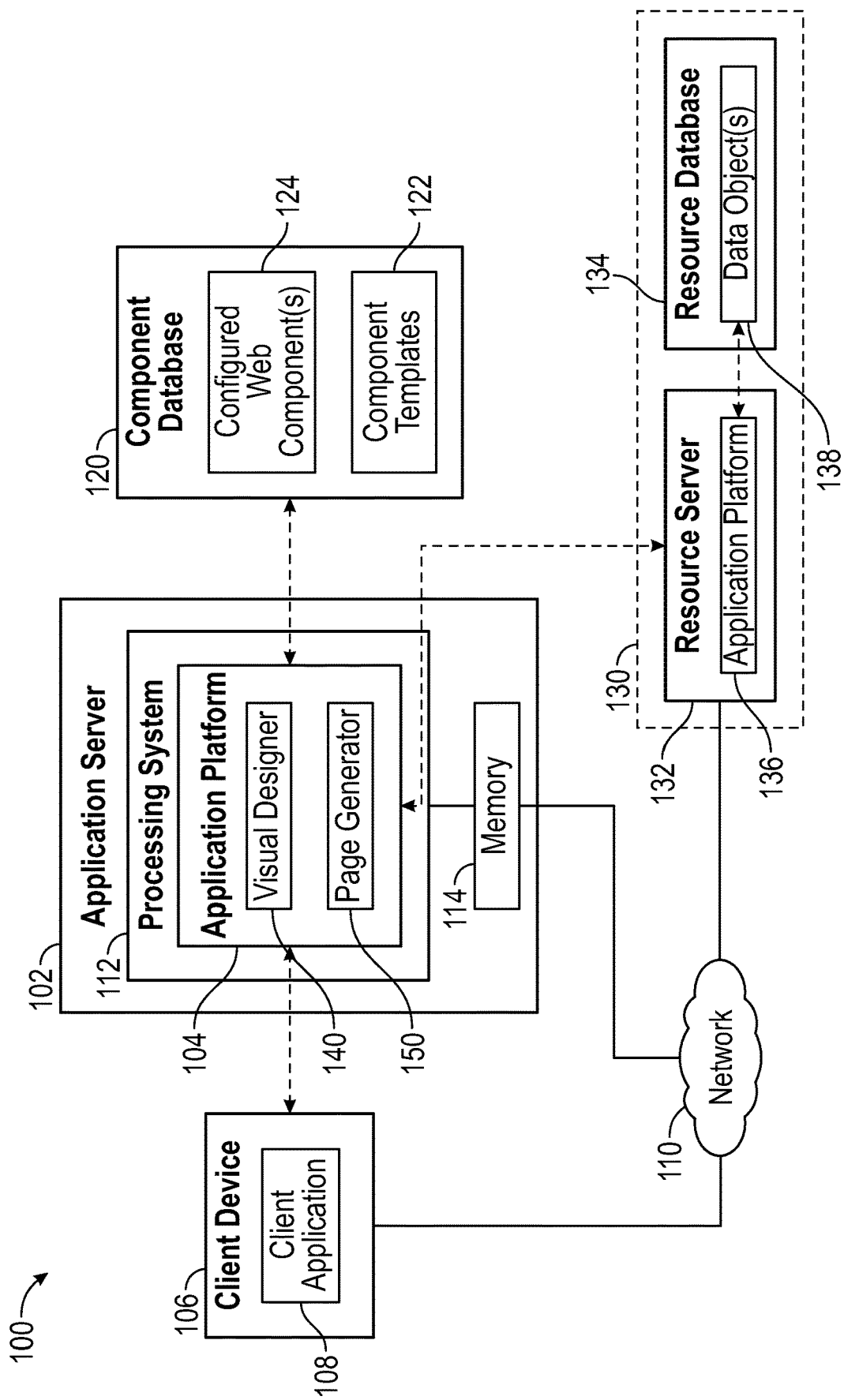
FIG. 1 is a block diagram illustrating a computing system according to some example implementations.

The subject matter described herein generally relates to allowing users to define sequences of graphical user interface (GUI) displays and actions for a web application process flow in a visual, WYSIWYG, drag and drop, declarative, and low code (or no code) manner using user-configurable web components. In exemplary implementations, a process flow builder GUI display is provided that includes a process flow editing region where a user may drag and drop instances of configurable web components, input, define, or otherwise configure values for attributes, properties or fields associated with those web components, and arrange the configured instances of web components in a desired order or sequence to achieve a desired process flow. For each instance of web component selected by a user for inclusion into the process flow, a respective configured web component object is created that includes autogenerated code for providing a desired behavior for the respective web component and/or autogenerated code for rendering or otherwise presenting the respective web component in accordance with the input user configuration for the respective web component instance. In this regard, a configured web component object maintains the autogenerated code for effectuating the respective web component in association with user input values for various metadata fields associated with the respective web component. In some implementations, the user configuration may include one or more uniform resource locator (URL) addresses or other network locations for a remote data source from which data is to be retrieved at run-time to generate, render or otherwise implement the respective web component in a manner that may vary dynamically based on the current state of the data at the remote data source.

Additionally, web component object corresponding to the visually-defined process flow is created that includes autogenerated code for implementing, executing or otherwise effectuating the sequence of configured web components added to the process flow editing region in accordance with the ordering of the configured web components within the process flow editing region. In this regard, the process flow web component object includes configured component sequence metadata for invoking or incorporating configured web components added to the process flow editing region in the desired order defined by the user. Code for a web page file for the web application is updated to include reference to the process flow web component object, thereby allowing a web browser to retrieve the process flow web component object at run-time and thereby incorporate the sequence of configured web components in the desired user-defined order.

In one or more implementations, the process flow builder GUI display is configurable to allow a user to toggle or switch between a design mode and a preview mode where the user can preview the run-time behavior or states of the process flow, including the state of the browser document object model (DOM) for the process flow and the inputs, outputs, requests, responses, or other data pertaining to server actions, application program interface (API) calls, and the like. The process flow builder GUI display may also be configurable to allow the user to apply different style sheets or custom web components to the process flow.

FIG. 1 depicts an exemplary computing system 100 for providing user-configurable custom web applications over a network that is capable of supporting a process flow builder GUI display and related visual process design services described herein. It should be appreciated that FIG. 1 depicts a simplified representation of the system 100 for purposes of explanation and is not intended to be limiting.

The illustrated system 100 includes an application server 102 that generally represents a server computing device, server computing system or another combination of processing logic, circuitry, hardware, and/or other components configured to support the processes, tasks, operations, and/or functions described herein. In this regard, the application server 102 supports an application platform 104 configurable to provide instances of one or more web applications within client applications 108 executed on client devices 106 communicatively coupled to the application server 102 via a communications network 110, such as the Internet or any sort or combination of wired and/or wireless computer network, a cellular network, a mobile broadband network, a radio network, or the like. The application server 102 generally includes a processing system 112, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system 112 may include or otherwise access a data storage element 114 (or memory) capable of storing programming instructions for execution by the processing system, that, when read and executed, are configurable cause processing system 112 to create, generate, or otherwise facilitate the application platform 104 that generates or otherwise provides instances of a web application at run-time (or "on-demand") based at least in part upon code and other data that is stored or otherwise maintained by the memory 114, a component database 120, or a remote location on the network 110 (e.g., at an external computing system 130). Depending on the implementation, the memory may be realized as a random access memory (RAM), read only memory (ROM), flash memory, magnetic or optical mass storage, or any other suitable non-transitory short or long term data storage or other computer-readable media, and/or any suitable combination thereof.

The client device 106 generally represents an electronic device coupled to the network 110 that may be utilized by a user to access and utilize an instance of a web application generated by the application platform 104 on the application server 102. In practice, the client device 106 can be realized as any sort of personal computer, mobile telephone, tablet or other network-enabled electronic device. In exemplary implementations, the client device 106 includes a display device, such as a monitor, screen, or another conventional electronic display, capable of graphically presenting data and/or information provided by the web application along with a user input device, such as a touchscreen, a touch panel, a mouse, a joystick, a directional pad, a motion sensor, or the like, capable of receiving input from the user of the client device 106. The illustrated client device 106 executes or otherwise supports a client application 108 that communicates with the application platform 104 on the application server 102 using a networking protocol. In some implementations, the client application 108 is realized as a web browser or similar local client application executed by the client device 106 that contacts the application server 102 and/or the application platform 104 using a networking protocol, such as the hypertext transport protocol (HTTP) or the like, to access or otherwise initiate an instance of the web application being presented on the client device 106 (e.g., by or within the client application 108). For purposes of explanation, but without limitation, the client application 108 may alternatively be referred to herein as a browser application or web browser.

In one or more implementations, the application platform 104 is configurable to facilitate or generate an instance of a web application at run-time or on-demand using configured web components 124 associated with the web application that are maintained in the component database 120 coupled to the application server 102. As described in greater detail below, the configured web components 124 are created, defined, or otherwise configured by a developer, creator, administer or other operator associated with the web application, who inputs, selects, configures or otherwise defines values for fields or parameters for instances of web component templates 122 that have been added to a process flow for integration with a particular web page associated with the web application. For example, a developer of a web application may configure an HTTP action, define a network address or provide other information for one or more fields of an instance of a web component template 122 added to a web page of the web application, which, in turn, may be utilized by the application platform 104 and/or a browser application 108 to retrieve data from an external computing system 130 over the network 110 for incorporation within the web application by populating or otherwise generating the instance of the configured web component 124 using the retrieved data at run-time or on-demand.

In the illustrated implementation depicted in FIG. 1, the external computing system 130 is realized as a database system that includes a resource server 132 communicatively coupled to the network 110 to support access to files, records, data, information, or other resources maintained in a resource database 134. In this regard, the resource server 132 generally represents a server computing device, server computing system or another combination of processing logic, circuitry, hardware, and/or other components configured to support remote access to data maintained in the resource database 134 via the network 110. In one or more implementations, the external computing system 130 is physically and logically distinct from the application server 102, for example, by residing at a different physical location than the application server 102. Additionally, the external computing system 130 may be owned, controlled, or otherwise operated by a third party that is different from the party that owns, controls and/or operates the application server 102 and/or the party that developed or is otherwise associated with the web application. That said, in some implementations, the external computing system 130 may be affiliated with the same party that owns, controls and/or operates the application server 102 and/or the application platform 104.

In one or more implementations, the external computing system 130 is realized as an on-demand multi-tenant database system that is capable of dynamically creating and supporting virtual applications based upon data from a common database 134 that is shared between multiple tenants, which may alternatively be referred to herein as a multi-tenant database. In accordance with one non-limiting example, the external computing system 130 is implemented in the form of an on-demand multi-tenant customer relationship management (CRM) system that can support any number of authenticated users of multiple tenants, for example, by providing, to any number of client devices, data and services generated by virtual applications at run-time (or on-demand) using a common application platform 136 that securely provides access to files, records, resources or other data objects 138 in the database 134 for each of the various tenants subscribing to the multi-tenant system. In this regard, one or more implementations of the external computing system 130 support one or more application program interfaces (APIs) at the resource server 132 that allow authorized and authenticated actors (e.g., the application server 102, the application platform 104, etc.) to retrieve or access data maintained in the database 134 that would otherwise be secured and inaccessible to unauthorized parties.

Still referring to FIG. 1, in exemplary implementations, the processing system 112 executes programming instructions that are configurable cause the application platform 104 to create, generate, or otherwise facilitate a visual process design application 140 (or visual process designer) capable of providing a process flow builder graphical user interface (GUI) display within a client application 108 at a client device 106 that allows a user to design or otherwise create web applications and corresponding web page GUI displays using the user-configurable web component templates 122 in a visual, drag and drop manner. Additionally, in one or more implementations, the processing system 112 executes programming instructions that are configurable cause the application platform 104 to create, generate, or otherwise facilitate a page generator application 150 capable of generating one or more web page GUI displays corresponding to a web application created or otherwise developed by a user using the visual process designer 140 based on the configured web components 124 associated with the web application. In this regard, the page generator application 150 may be configurable to cause the client application 108 to retrieve and render the configured web components 124 at run-time in accordance with the user-defined configuration of the web application to thereby provide an instance of the web application within the client application 108 at the client device 106.

The configurable web component templates 122 generally represent self-contained and reusable elements or other resources that may be added or otherwise incorporated into a web page and generated or otherwise rendered at run-time in accordance with user-defined or user-configured values for various metadata fields or parameters of the respective web component template 122. For example, the configurable web component templates 122 may correspond to configurable web components for various GUI elements, such as buttons, text boxes, lists, menus, and/or the like, which may be added to a web page GUI display in a drag and drop manner and then manually configured by a developer user. In some implementations, a web component template 122 may include or otherwise have associated therewith one or more application programming interfaces that are configurable by a developer user to modify internal implementation details of the component to be opaque to a user of the component.

After a developer user utilizes the process flow builder GUI display to add an instance of a web component template 122 to a web page and define values for the fields associated with the respective web component template 122, the visual process designer 140 and/or the application platform 104 are configurable to generate and store a configured instance of the web component template 122 in the component database 120 as a configured web component 124 associated with the web application that maintains the user-defined values for the respective instance of the web component template 122 in association with the other code and/or data defining the layout, rendering, or behavior of the respective web component template 122. For example, the configured web component 124 may include presentation code (e.g., Hypertext Markup Language (HTML), cascading style sheet (CSS), and/or the like) defining the manner in which the configured web component 124 is to be displayed, rendered or otherwise presented by the client application 108. The configured web component 124 may also include behavioral code (e.g., JavaScript or other client-side executable code) defining the event-driven behavior of the configured web component 124 within the client application 108 (e.g., in response to user actions, server actions, an event associated with another web component, etc.). The configured web component 124 also includes the user-defined metadata values for the configured web component 124 which may be invoked, referenced, or otherwise utilized by the presentation code and/or behavioral code to generate and render the configured web component 124. Accordingly, the configured web components 124 may be dynamic, with the content and/or behavior thereof varying each time a web page GUI display including one or more configured web component(s) 124 is viewed or accessed, for example, depending on the user of a client device 106 accessing the web application or other contextual information, in response to changes to data referenced and/or invoked by the configured web component(s) 124, and/or the like.

Figure 2:
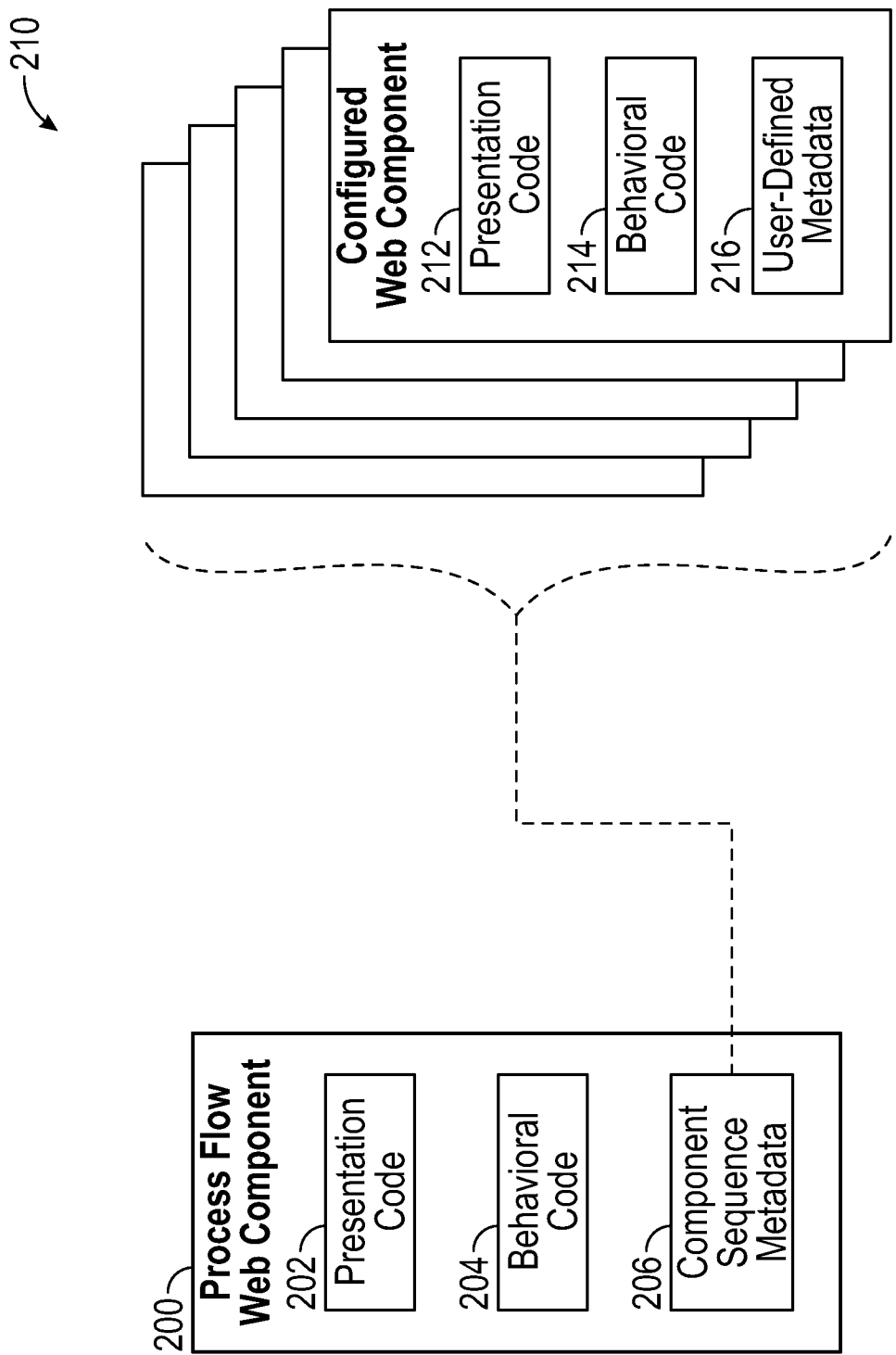
FIG. 2 is a block diagram illustrating a process flow web component suitable for use with the computing system of FIG. 1 according to some example implementations.

Referring now to FIG. 2 with continued reference to FIG. 1, in exemplary implementations described herein, visual process designer 140 is configurable to allow a developer user to utilize the process flow builder GUI display to create or otherwise define configured web components 124 associated with a web application that include a process flow web component 200 that invokes or otherwise references a user-defined sequence of configured web components 210 for incorporation within the web application in accordance with the user-defined sequence. In this regard, the configured process flow web component 200 includes HTML code or other presentation code 202 that defines the graphical structure or other characteristics of the web page GUI display(s) associated with a process flow for the web application along with JavaScript code or other client-side executable behavioral code 204 that defines the event-driven behavior associated with the process flow depicted using the web page GUI display(s) defined by the presentation code 202. The configured process flow web component 200 also includes metadata that identifies the sequence of configured web components 210 to be incorporated or otherwise integrated into the web page GUI display(s) in accordance with an order defined by the developer user associated with the web application. In this regard, the client application 108 executes the presentation code 202 and the behavioral code 204 to generate the web page GUI display(s) associated with the web application and responds to user actions or events at the client device 106 by utilizing the configured component sequence metadata 206 to incorporate configured web components 210 within the web page GUI display(s) in accordance with a user-defined sequence to achieve the process flow for the web application defined by the developer user.

In a similar manner as described above, each of the configured web components 210 that are incorporated into a web page GUI display for the process flow similarly includes HTML code or other presentation code 212 defining the manner in which the configured web component 210 is to be displayed or rendered and JavaScript or other client-side executable behavioral code 214 defining the event-driven behavior of the configured web component 210. Additionally, each configured web component 210 includes user-defined metadata 216 including values or properties that are input or otherwise defined by the developer user for various fields, parameters, variables or other attributes associated with the respective web component 210. As described in greater detail below in the context of FIGS. 3-5, in exemplary implementations, a process flow builder GUI display allows the developer user to add instances of web component templates 122 to a process flow region of the process builder GUI display in a visual, drag and drop manner, and then define metadata values or properties to be associated with the corresponding configured web components 210 added to the process flow region. For each instance of web component template 122 added to the process flow, the visual process designer 140 automatically generates or otherwise creates the presentation code 212 and behavioral code 214 for the corresponding configured web component 124, 210 based on the component type associated with the web component template 122 and the user-defined metadata values 216 to be associated with the configured web component 124, 210 and then stores the data object maintaining the association between the presentation code 212, the behavioral code 214, and the user-defined values 216 associated with the configured web component 124, 210 in the component database 120. The metadata 216 may also include default values or parameters defined by a respective component template 122 or other values that are not defined by a user, such as, for example, minimum field lengths, maximum field lengths, tooltips, error handling, conditional display criteria (e.g., show/hide), and the like.

Based on the ordering or sequencing of the configured web components 210 added to the process flow region of the process flow builder GUI display, the visual process designer 140 automatically generates or otherwise creates the process flow presentation code 202 and behavioral code 204 for generating one or more web page GUI displays corresponding to the ordered sequence of configured web components 210 within the process flow region of the process builder GUI display and then stores the data object maintaining the association between the process flow presentation code 202, the process flow behavioral code 204, and metadata 206 identifying the sequence of configured web components 124, 210 associated with the process flow in the component database 120. In some implementations, the component sequence metadata 206 includes a JavaScript Object Notation (JSON) metadata that is utilized to render the graphical user interface for the process flow at run-time when a web page including the process flow web component 200 is loaded. In this regard, when additional configurable web component templates 122 for GUI elements are added to the process flow, the component sequence metadata 206 is updated to incorporate the configured web components 124, 210 corresponding to those configured GUI elements at run-time. Similar to the web components 210, the metadata 206 for the process flow web component 200 may also include additional values or parameters that are not defined by a user using the process flow GUI display.

When a user of a client device 106 navigates a browser or similar client application 108 to a uniform resource locator (URL) address associated with the web application that includes a reference to the configured process flow web component 124, 200, the client application 108 retrieves or otherwise obtains the configured process flow web component 124, 200 via the page generator application 150 and processes or otherwise executes the process flow HTML or other presentation code 202 and the process flow JavaScript or other behavioral code 204 to generate a web page GUI display within the client application 108 at the client device 106. Based on the configured web component sequence metadata 206, the client application 108 and/or the page generator application 150 retrieves or otherwise obtains the configured web component(s) 124, 210 of the configured component sequence corresponding to the initial web page GUI display for the web application, and the client application 108 processes or otherwise executes the presentation code 212 and the behavioral code 214 to generate the initial configured web component(s) 124, 210 of the configured component sequence and populate the web page GUI display within the client application 108 at the client device 106 with the generated web component(s) 124, 210. Thereafter, based on the process flow behavioral code 204 and/or the behavioral code 214 associated with the currently displayed web component(s) 124, 210, the client application 108 and/or the page generator application 150 responds to user actions or other events to dynamically update the web page GUI display at the client application 108 to advance or progress through the process flow associated with the web application to obtain and render configured web component(s) 124, 210 in accordance with the configured component sequence metadata 206.

Figure 3:
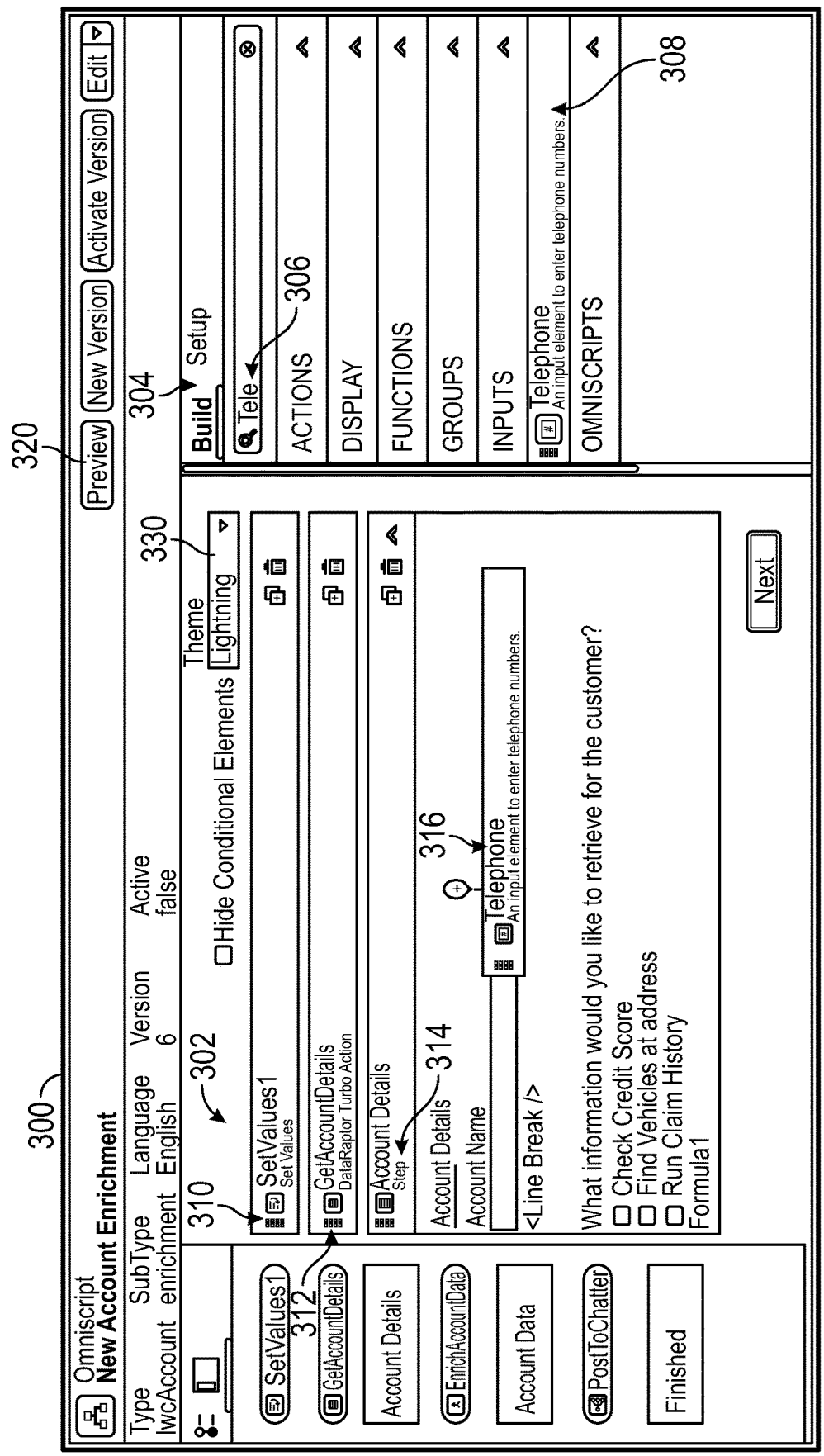
FIGS. 3-8 depict a sequence of web page graphical user interface (GUI) displays suitable for presentation on a client device by a visual process design service in the computing system of FIG. 1 according to some example implementations.

FIGS. 3-10 depict process flow builder GUI displays that may be generated by the visual process designer 140 within the browser application 108 at the client device 106 in accordance with one or more implementations. FIG. 3 depicts a state of a process flow builder GUI display 300 for creating, defining, or modifying a process flow in a design mode that includes a process flow editing region 302 and a component menu sidebar region 304. The component menu sidebar region 304 includes a component lookup text box 306 that a developer user may utilize to search or otherwise query the component database 120 for component templates 122 that match or otherwise corresponding to a user input search string. For example, in the illustrated implementation, in response to a user inputting a search string for a telephone number in the component lookup text box 306, the visual process designer 140 may query the component database 120 using the input search string to identify a telephone number component template 308 for presentation within the component menu sidebar region 304.

As shown, the component menu sidebar region 304 may group template components by component type, for example, action components, display components, functional components, group components, input components, and script components. In one implementation, the action components include customizable web components that correspond to server side actions and/or client side actions that are rendered as a button when dragged onto a display component within the process flow editing region 302, or are run automatically when dragged in between display components within the process flow editing region 302, such as, for example, invoking Apex code, invoking a REST API call or SOAP API call from a server, setting values in a data JSON associated with a GUI display, invoking a REST API from a web browser. Functional components may include customizable web components for formulas that perform complex calculations to be invoked client-side. Group components may include customizable web components that include multiple constituent web components. In one or more implementations, the script components include process flow web components that are designated as reusable or incorporation and customization within other process flows.

The process flow editing region 302 includes graphical representations of instances of component templates 122 that have been added to the process flow by the developer user in a visual, drag and drop manner. For example, a functional component 310 to set default values that may drive conditional GUI logic or be used in a later API call (e.g., set a node in the JSON AccountType=Customer) has been added to the process flow editing region 302 as an initial component to be associated with the process flow, followed by an action component 312 to get account data (e.g., a DataRaptor to GET account record data, such as name and phone number, from a database system 130 which may be utilized to prefill fields of a GUI display), followed by a display component 314 that may be populated using the results or outputs from the preceding components 310, 312. As illustrated, after adding the display component 314 by dragging and dropping an instance of a display component template into the process flow editing region 302, the developer user may utilize GUI elements depicted within the graphical representation of the display component 314 to configure or otherwise define values or attributes for the configured display component 314, such as, for example, providing a name or title for the display component (e.g., "Account Details"). Additionally, the process flow builder GUI display 300 allows the developer user to drag and drop the telephone input component template 308 to within the graphical representation of the configured account details display component 314 to create an instance of the telephone input component 316 to be integrated or otherwise incorporated into the configured account details display component 314.

Figure 4:
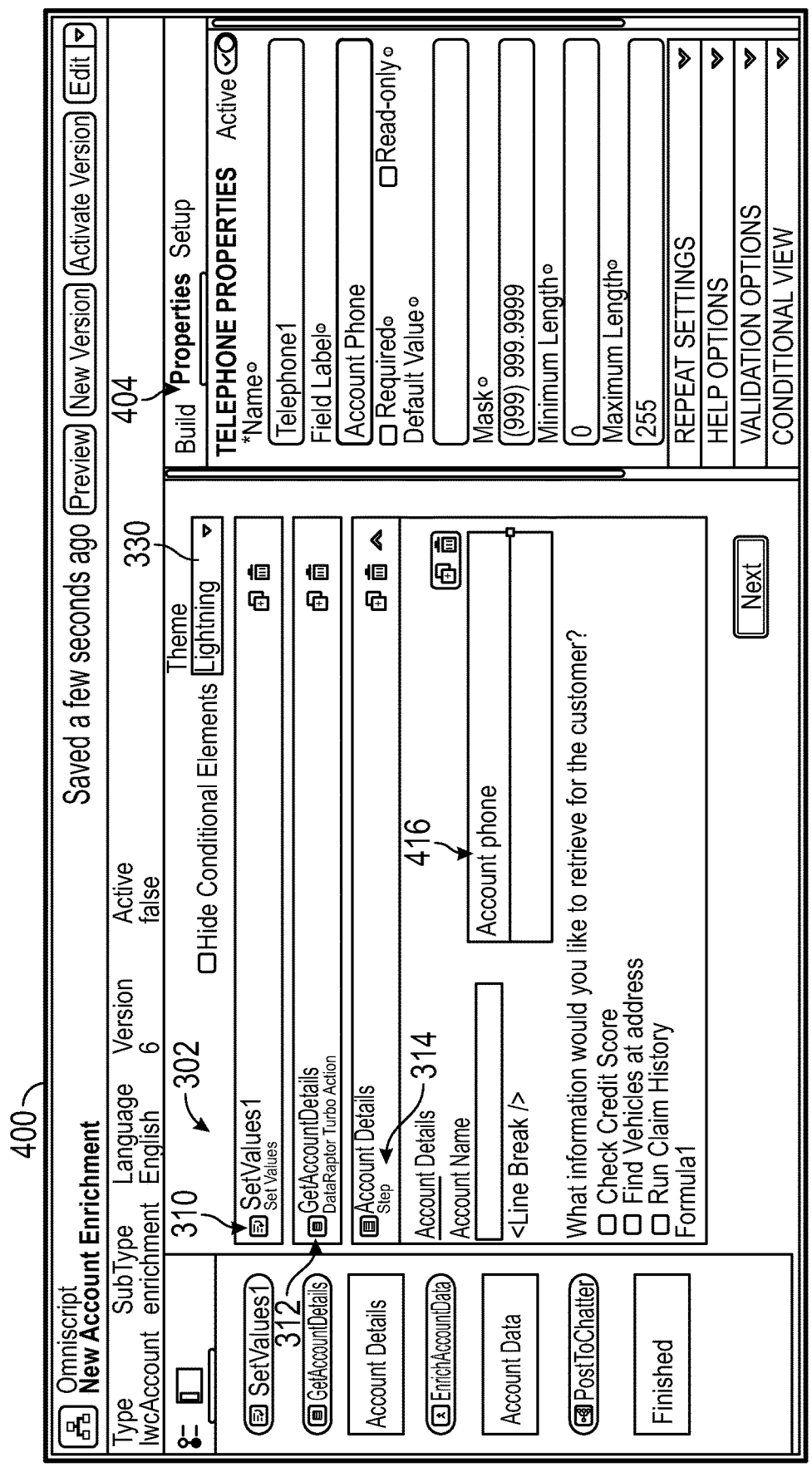

Turning now to FIG. 4, after dragging and dropping an instance of the telephone input component 316 into the process flow editing region 302, an updated process flow builder GUI display 400 is provided that includes a graphical representation of the telephone input component 416 at the dropped location where it was to be added. The updated process flow builder GUI display 400 also includes a component definition sidebar region 404 that includes text boxes and other GUI elements that are configurable to allow the developer user to manually input or otherwise define the values for the attributes, properties, or fields of metadata to be associated with the configured telephone input component 416, such as, for example, a value for a name field (e.g., "Phone"), a value for a field label field (e.g., "Account Phone"), default values, minimum allowable values and/or maximum allowable values for any fields to be defined by an end user, and the like. As the user inputs, defines, or otherwise modifies values within the component definition sidebar region 404, the graphical representation of the telephone input component 416 within the process flow editing region 302 is dynamically updated substantially in real-time (e.g., to depict the "Account Phone" field label when entered into the field label text box).

Depending on the type of configurable web component added to the process flow editing region, the component definition sidebar region of the process flow builder GUI display may include GUI elements that may be utilized by the user to input or otherwise define different remote locations (e.g., URLs, and the like) from which data may be obtained to populate or otherwise implement the respective web component, and/or to identify API calls (e.g., Simple Object Access Protocol (SOAP), Representational State Transfer (REST), and/or the like) that may be utilized to obtain data for populating or otherwise implementing the respective web component. In one or more implementations, the process flow builder GUI display may be configurable to allow a developer user to incorporate and add their own custom web components to the process flow editing region, or extend one of the configurable web component templates in a declarative manner to create new custom web components that can be incorporated or added to the process flow editing region (e.g., by adding custom JavaScript, animation effects, custom validations, and/or the like to a configurable web component).

After the developer user configures the fields or parameters of the telephone input component 416, the visual process designer 140 automatically generates a corresponding instance of a configured web component 124, 210 that includes the user-defined values for the fields or parameters of the telephone input component 416 (e.g., user-defined metadata 216) in association with automatically generated presentation code 212 and the behavioral code 214 based on the telephone input component template 122, 308 using the user-defined values to provide the desire display characteristics and event-driven behavioral characteristics for the configured telephone input component 416. Additionally, the visual process designer 140 updates or otherwise modifies the configured web component 124, 210 for the configured account details display component 314 to include reference to the configured telephone input component 124, 210, 416 integrated therewith, for example, by automatically generating updated Presentation code 212 for the configured account details display component 124, 210, 314 to incorporate the configured telephone input component 124, 210, 416 at the desired spatial position within the configured account details display component 124, 210, 314.

Figure 5:
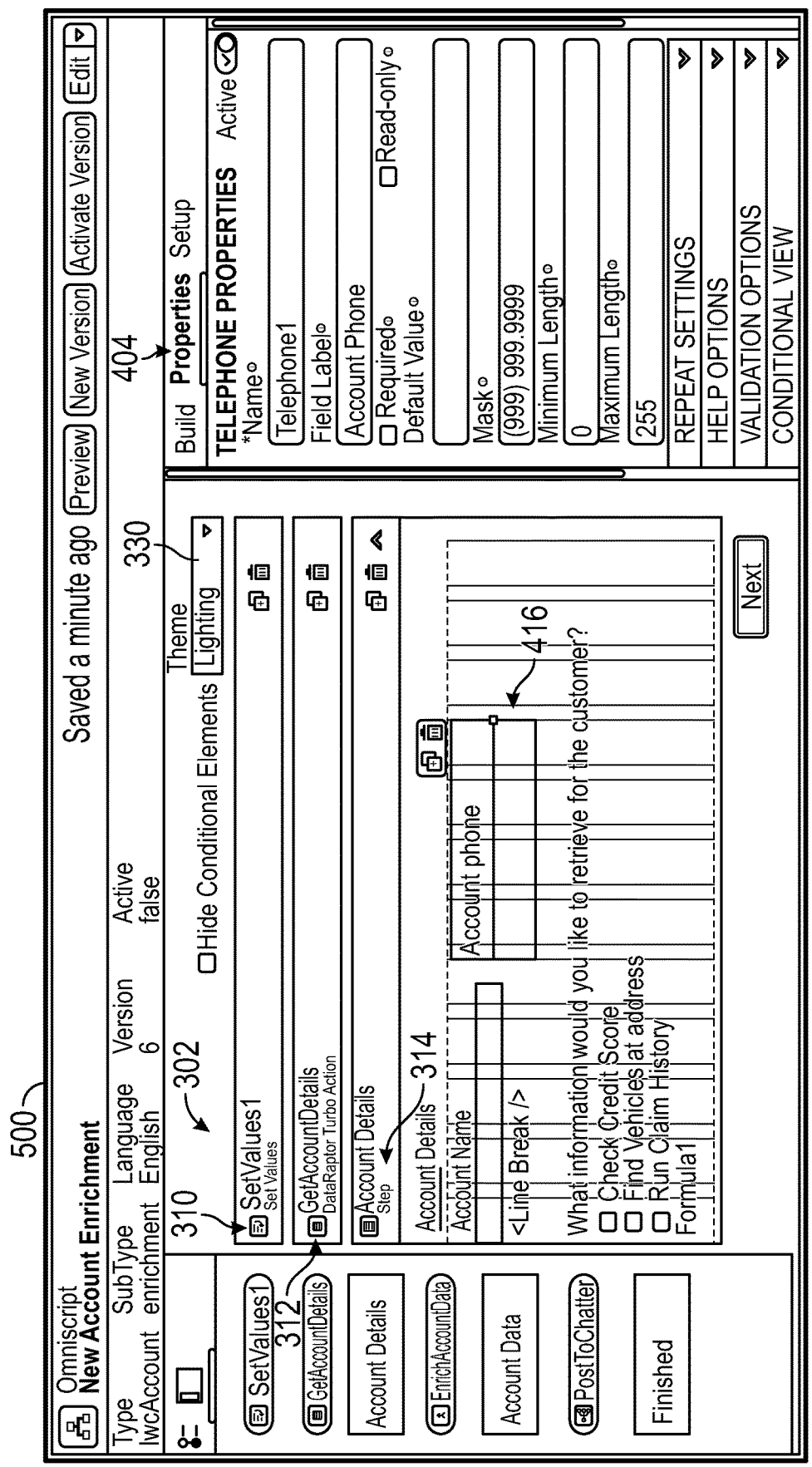

Referring now to FIG. 5, in some implementations, the process flow builder GUI display allows the developer user to adjust, modify, or otherwise define the spatial characteristics or other visual characteristics of a web component added to a process flow in a visual, WYSIWYG manner. For example, FIG. 5 depicts an updated process flow builder GUI display 500 that reflects a developer user having manually selecting and adjusting the width of the telephone input component 416 within the account details display component 314. In response, the visual process designer 140 may dynamically update the Presentation code 212 associated with the configured telephone input component 124, 210, 416 to reflect the modified spatial characteristics of the telephone input component 124, 210, 416 without modifying the Presentation code 212 associated with the account details display component 314.

Figure 6:
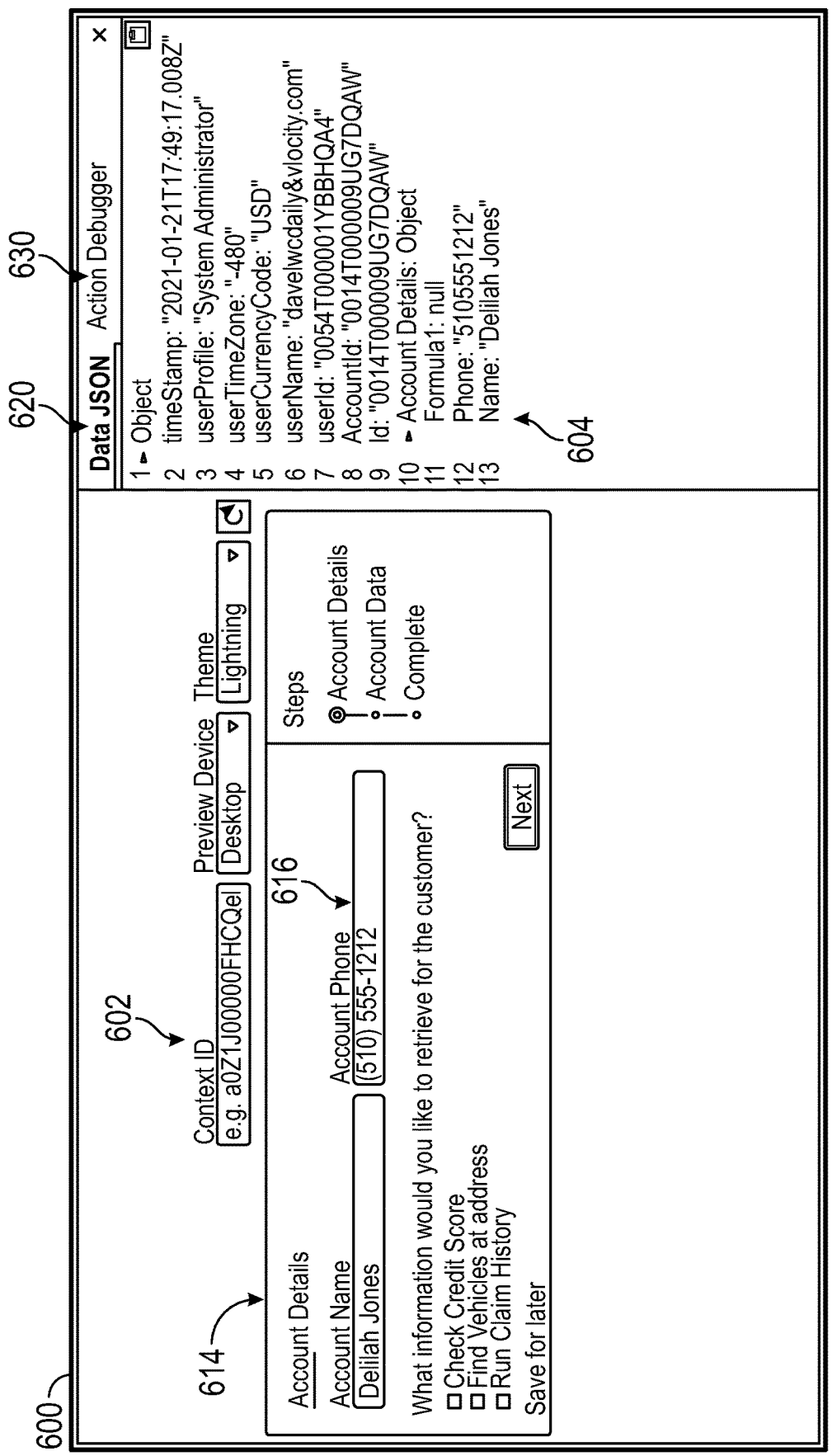

Referring now to FIG. 6, in response to user selection of a mode selection GUI element 320, the visual process designer 140 may transition from a design mode of the process flow builder GUI display depicted in FIGS. 3-5 to a preview mode depicted in FIG. 6. In this regard, the process flow builder GUI display 600 in the preview mode corresponds to the rendering and execution of the process flow web component 200 defined by the configured web components 310, 312, 314, 316 added to the process flow editing region 302. In one implementation, the client-side web browser application 108 loads the web page and executes the process flow web component incorporated therein within the preview region 602, while the visual process designer 140 listens for events with respect to the data JSON and/or server actions for dynamically updating the sidebar region 604 in accordance with the selected tab 620, 630. The illustrated process flow preview region 602 includes a graphical representation 614 of the configured account details display component 314 that includes a graphical representation 616 of the configured telephone input component 416 at the corresponding spatial location within the account details display 614. The preview mode of the process flow builder GUI display 600 also includes a debugging sidebar region 604. In the implementation in FIG. 6, the data JSON tab 620 is selected, which, in turn results in the visual process designer 140 generating a graphical representation of the preview region 602 in the browser document object model (DOM) format, where each element displayed within the preview region 602 has a corresponding JSON key and value, where the JSON key/value pairs control conditions on the display and are input to any external application programming interface (API) calls. Additionally, any API responses are also applied to the data JSON visualization depicted in the debugging sidebar region 604 when the data JSON tab 620 is selected. This allows the developer user to analyze and debug the process flow concurrently while previewing the currently configured presentation of the process flow to an end user.

Prior to generating the preview region 602, the visual process designer 140 generates configured web components 124, 210 corresponding to the web components 310, 312, 314, 316 added to the process flow editing region 302 and generates a process flow web component 200 that includes component sequence metadata 206 that references or otherwise incorporates the configured web components 124, 210 in the order or sequence defined within the process flow editing region 302. In this regard, the behavioral code 204 and the component sequence metadata 206 for the process flow web component 200 corresponding to the process flow editing region 302 may be configurable to invoke the configured web component 124, 210 for the set values functional component 310 before invoking the configured web component 124, 210 for the get account data action component 312, and then invoking the configured web component 124, 210 for the account details display component 314 (which, in turn, invokes the configured web component 124, 210 for the telephone input component 416). In other words, the component sequence metadata 206 refers to the configured web component database objects 124, 210 corresponding to the configured instances of web component templates added to the process flow editing region 302 in accordance with their respective hierarchical locations within the process flow editing region 302 relative to the other instances of configured web components within the process flow editing region 302. Additionally, in some implementations, the visual process designer 140 generates the presentation code 202 for the process flow web component 200 in accordance with the theme or cascading style sheet (CSS) designated for the process flow by the developer user via one or more GUI elements 330 within the process flow builder GUI display. In some implementations, the process flow builder GUI display is configurable to allow a selected style sheet (e.g., indicated by a drop-down menu element 330) to be applied to the process flow web component 200 and/or the configured web components 124, 210 associated therewith, either in whole or in part. For example, the process flow builder GUI display may allow the developer user to apply a style sheet generically across all constituent web components of the process flow or in a targeted manner to only certain ones of the constituent web components of the process flow, or to apply a style sheet only to certain portions of the process flow web component and/or the constituent web components (e.g., only at a header level).

To generate the preview region 602, the visual process designer 140 executes the presentation code 202 and the behavioral code 204 associated with the configured process flow web component 200 and utilizes the component sequence metadata 206 to invoke and perform the configured set values function defined by set values functional component 310 before invoking and performing the get account data action defined by the account data action component 312. After performing the configured function and action, the visual process designer 140 executes the presentation code 212 and behavioral code 214 associated with the account details display component 314 to generate the account details display 614 and executes the presentation code 212 and behavioral code 214 associated with the telephone input component 416 to generate a text box 616 for the telephone input component 416 within the account details display 614.

Figure 7:
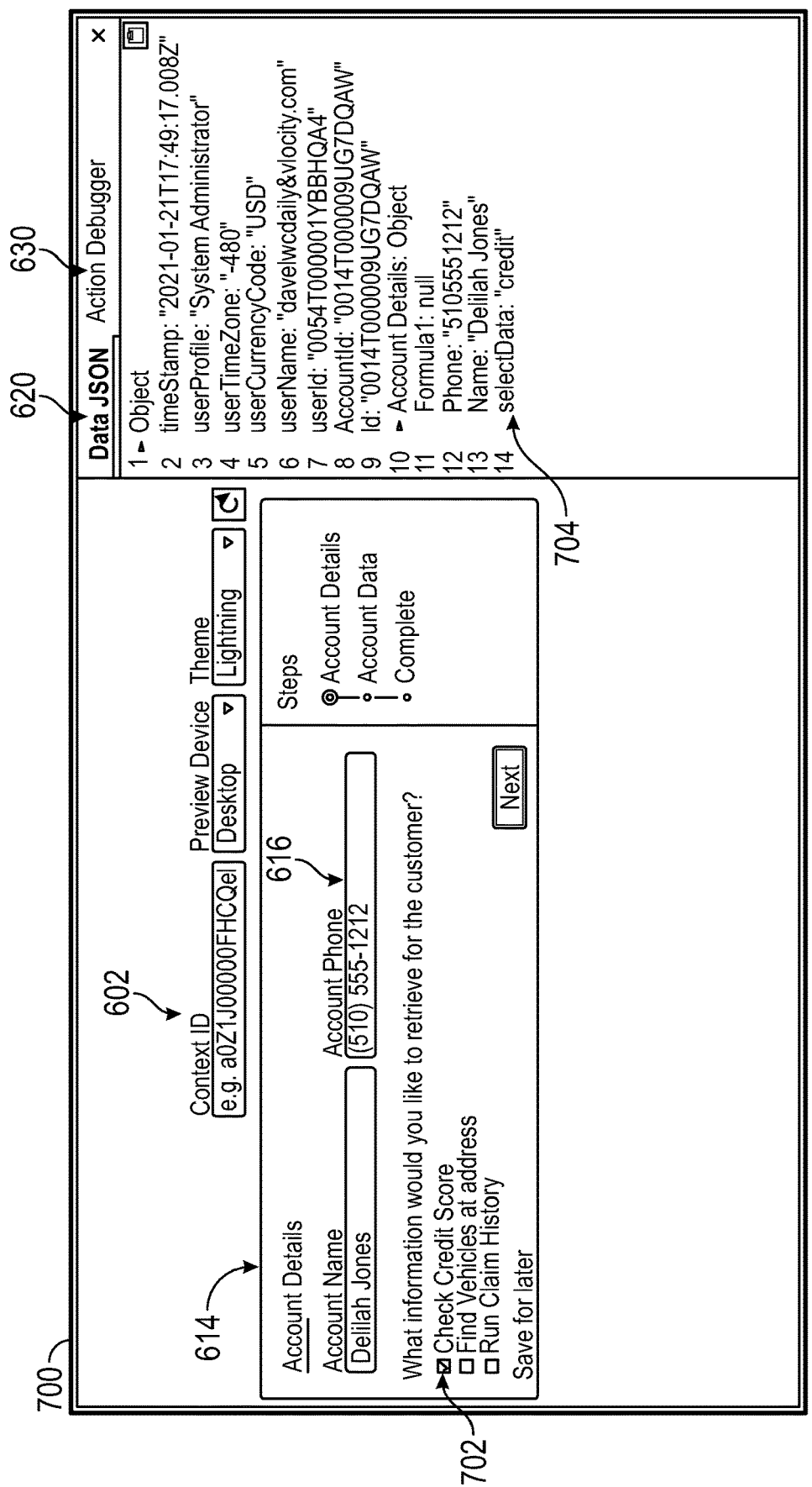

In the preview mode, the visual process designer 140 responds to user actions or other events with respect to the displayed components 612, 614 within the preview region 602 in accordance with the event-driven behavioral configurations for those components 612, 614, and dynamically updates the debugging sidebar region 604 in concert with the preview region 602 in response to events, actions, or other changes at or within the preview region 602. For example, when the user inputs or otherwise types a phone number into the text box 616 associated with the telephone input component 416, the debugging sidebar region 604 to indicate the value input by the user in association with the JSON key associated with the telephone input component 416 so that the graphical representation of the browser DOM state reflects the current state of the telephone input component 416 within the preview region 602. As shown in FIG. 7, in response to a user action to select a checkbox GUI element 702, the debugging sidebar region 604 is dynamically updated to reflect the current browser DOM state in the preview region 602 and include a corresponding graphical representation 704 of the JSON key and value associated with the selected checkbox GUI element 702.

Figure 8:
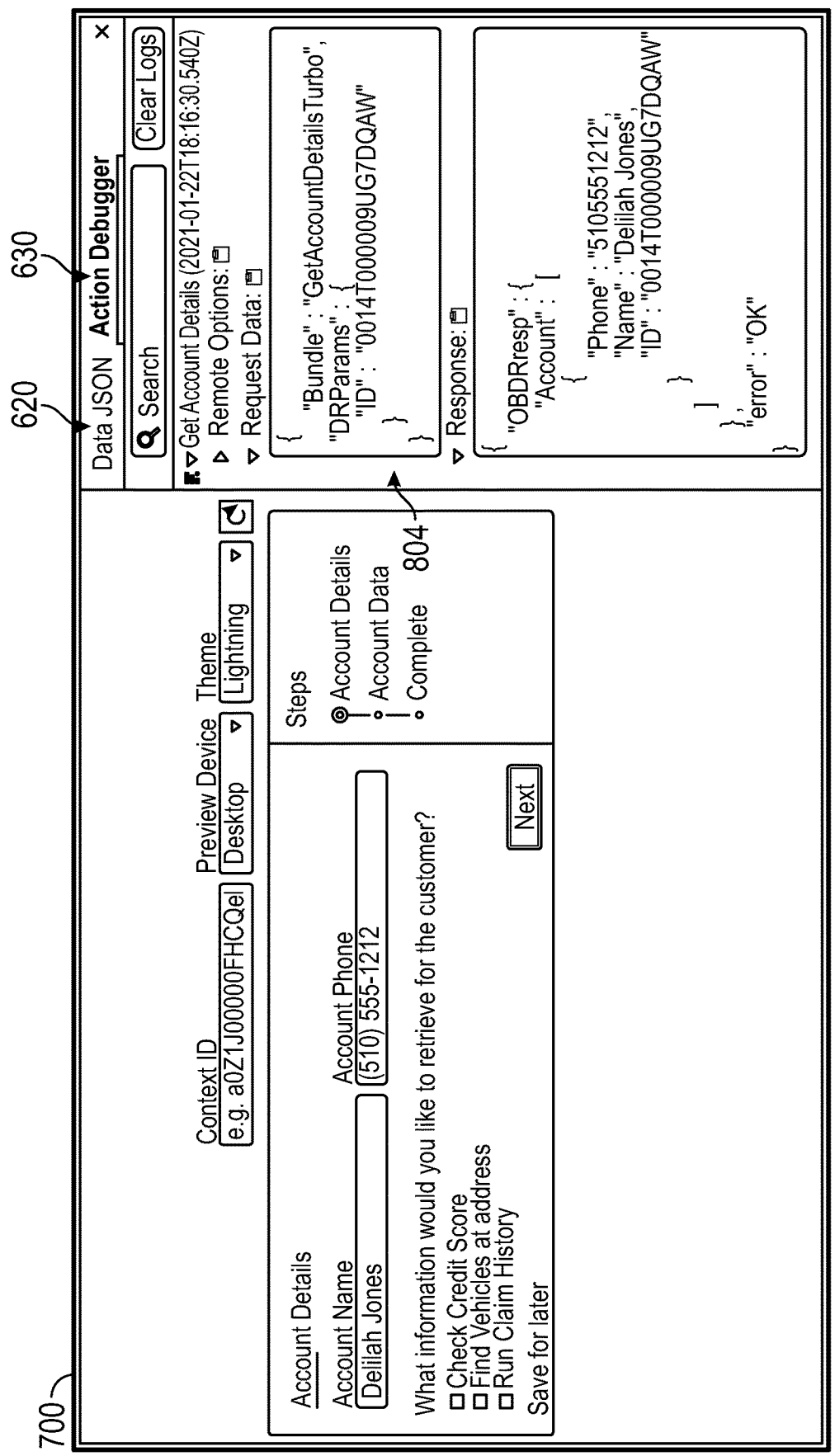

Referring now to FIG. 8, in response to user selection of the action debugging tab 630, an updated debugging sidebar region 804 is provided that displays a graphical representation of a log of actions performed in connection with the process flow, that is, the current and/or preceding web components of the configured component sequence for the process flow that have already been displayed, rendered or otherwise executed. For example, behavioral code 214 and configured metadata 216 associated with the configured get account data action component 312 may cause the visual process designer 140 to query a network location designated by the metadata 216 (e.g., database system 130) to retrieve the name, phone number, and/or other details associated with an account and apply the retrieved data to the browser DOM and/or JSON data, which, in turn, may be referenced or otherwise utilized by the code 212, 214 associated with the account details display component 314 to automatically populate a name field of the account details display with the retrieved name, by the code 212, 214 associated with the telephone input component 416 to automatically populate the associated text box 616, and so on. The visual process designer 140 logs or otherwise records information or data pertaining to requests initiated or transmitted by the visual process designer 140, responses received by the visual process designer 140, and/or other transactions associated with execution or implementation of the components associated with the process flow and provides a graphical representation of the data associated with the requests, responses, and/or other transactions within the action debugging sidebar region 804 when the action debugging tab 630 is selected. In this regard, the visual process designer 140 also logs browser actions that are initiated or otherwise triggered by web components integrated into the process flow, such as, for example, REST API calls, and the like. A developer user may utilize the action debugging sidebar region 804 to search, filter or otherwise review and analyze the actions in concert with or otherwise concurrent to advancing through the process flow within the preview region 602.

Still referring to FIGS. 3-8, it should be noted that the process flow builder GUI display allows a developer user to switch or toggle back and forth between the design mode and the preview mode as desired throughout development of a process flow. For example, the developer user may utilize the design mode to drag and drop and configure new web components to be added to the process flow in a WYSIWYG manner, toggle to the preview mode to analyze the presentation, behavior, JSON data and/or actions associated with the newly added and configured web components, and then iteratively toggle back and forth between the design mode and the preview mode to modify or otherwise edit the existing web components and/or add new web components until achieving a desired process flow. A developer user may utilize the process flow builder GUI display to activate the process flow, which in turn, generates and deploys the configured process flow web component to the component database 120 and/or to another location associated with the developer user (e.g., to a database system 130 that maintains custom web components associated with the developer user). As described above, some implementations may allow the process flow web component to be deployed for integration as a constituent web component into other process flows, and the process flow web component may be reconfigurable within other process flows.

Figure 9:
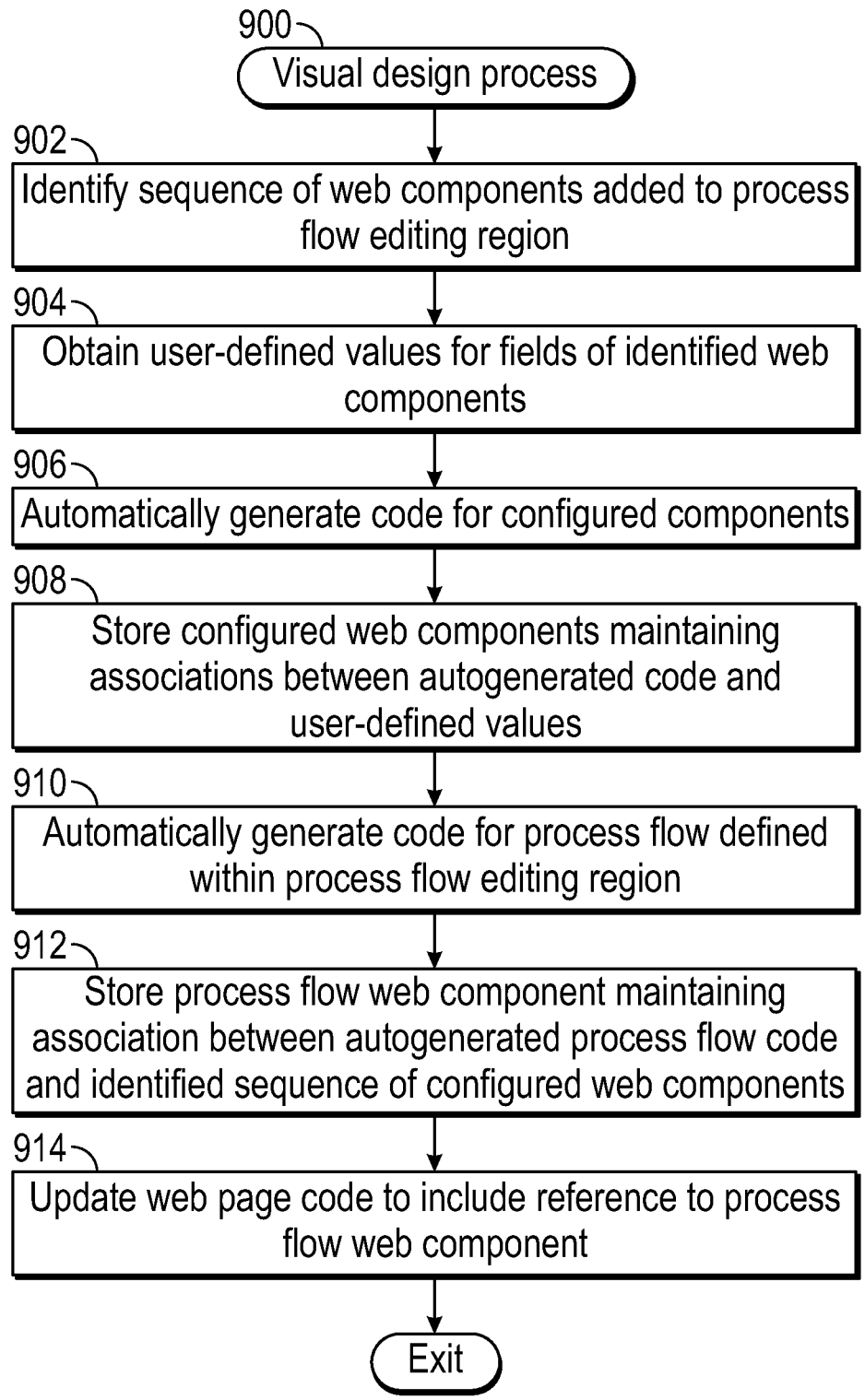
FIG. 9 is a flow diagram illustrating a visual design process suitable for use in connection with a visual process design service in the computing system according to some example implementations.

FIG. 9 depicts an exemplary visual design process 900 that may be implemented or otherwise performed by a computing system to allow users to design, define or otherwise configure sequences of GUI displays and related actions for incorporation into a web page associated with a web application in a visual, WYSIWYG, drag and drop manner and perform additional tasks, functions, and/or operations described herein. For illustrative purposes, the following description may refer to elements mentioned above in connection with FIG. 1. In this regard, while portions of the visual design process 900 may be performed by different elements of the computing system 100, for purposes of explanation, the subject matter is described herein in the context of the visual design process 900 being primarily performed by the application server 102, the application platform 104 and/or the visual process designer 140. It should be appreciated that the visual design process 900 may include any number of additional or alternative tasks, the tasks need not be performed in the illustrated order and/or the tasks may be performed concurrently, and/or the visual design process 900 may be incorporated into a more comprehensive procedure or process having additional functionality not described in detail herein. Moreover, one or more of the tasks shown and described in the context of FIG. 9 could be omitted from a practical implementation of the visual design process 900 as long as the intended overall functionality remains intact.

Referring to FIG. 9, the visual design process 900 identifies or otherwise obtains a sequence of web components added to a process flow editing region of a process flow builder GUI display by a user designing a process flow, and for each web component of the sequence, identifies or otherwise obtains values for various fields of the respective web component that are input, selected or otherwise defined by the user (tasks 902, 904). For example, as described above in the context of FIGS. 3-8, the application server 102 and/or the application platform 104 may provide a process flow builder GUI display associated with a visual process design service within a browser application 108 at a client device 106 that includes a menu of configurable web components that may be integrated into a web page by dragging and dropping selected ones of the configurable web components to a process flow editing region of the process flow builder GUI display. After a user drags and drops an instance of a selected type of configurable web component to the process flow editing region, the process flow builder GUI display is configurable to allow the user to input, select, or otherwise define different values for different parameters, attributes, properties or fields to be associated with the selected type of configurable web component. Likewise, the process flow builder GUI display to allow a user to drag and drop instances of configurable web components to the process flow editing region to different locations relative to other web components (e.g., above or below a previously added web component, to the left or right of a previously added web component, etc.) to define an order or sequence for the instances of web components added to the process flow editing region.

For each instance of a configurable web component added to the process flow editing region, the visual design process 900 automatically generates code for instantiating or otherwise implementing the respective web component at run-time and stores or otherwise maintains the autogenerated code associated with the respective web component in association with the user-defined values that define the user's desired configuration of that respective web component (tasks 906, 908). For example, based on the component type, rules, structure, and/or other attributes assigned to the particular configurable component template 122 associated with the respective instance of configurable web component, the visual process design service supported by the application server 102 and/or the application platform 104 automatically generates presentation code 212 (e.g., HTML code or the like) for rendering the respective web component and automatically generates behavioral code 214 (e.g., JavaScript or the like) for providing the desired event-driven behavior of the respective web component using one or more of the user-defined values for the configuration of the respective web component. The visual process design service then stores or otherwise maintains a configured web component object 124, 210 in a component database 120 that maintains an association between the autogenerated code 212, 214 for that respective instance of configured web component added to the process flow editing region and the user-defined metadata values 216 that were input, defined, or otherwise configured for that respective instance of configured web component using the process flow builder GUI display.

In a similar manner, the visual design process 900 automatically generates code for instantiating or otherwise implementing the process flow defined within the process flow editing region at run-time and stores or otherwise maintains the autogenerated code associated with the process flow web component in association with the metadata that identify the order or sequence of web components defined for the process flow within the process flow editing region (tasks 910, 912). In this regard, the visual process design service supported by the application server 102 and/or the application platform 104 automatically generates presentation code 202 (e.g., HTML code or the like) for rendering a web page GUI display for the defined process flow and automatically generates behavioral code 204 (e.g., JavaScript or the like) for providing the desired event-driven behavior of the process flow when invoking, implementing or otherwise executing the constituent web components of the process flow in the defined sequence. The visual process design service then stores or otherwise maintains a process flow web component object 124, 200 in the component database 120 that maintains an association between the autogenerated process flow code 202, 204 and the metadata values 206 that identify the order or sequence for invoking the constituent configured web component objects 124, 210 defined for the process flow. In one or more implementations, using the component sequence metadata 206, the process flow web component 200 is automatically generated with HTML code 202 that contains only the elements defined in the component sequence metadata 206 in the exact order configured by the user, and the JavaScript code 204 includes an embedded JSON version of the metadata 206. For a deployment to an on-demand multi-tenant database system 130 or integration with an on-demand virtual application platform 104, 136, a specific metadata file associated with the process flow web component 200 may also be generated that identifies the particular parts of the application platform 104, 136 where the generated process flow web component 200 can be utilized.

In one or more implementations, the visual design process 900 automatically updates the web page code associated with a web application to incorporate or otherwise include reference to the process flow component object (task 914). For example, when a developer user selects or otherwise manipulates an activate button or similar GUI element within the process flow builder GUI display to deploy or otherwise implement the process flow defined within the process flow editing region within a web application, the visual process design service may automatically update the HTML code of an HTML file associated with the web application that resides at a URL or other network address associated with the web application to include a reference to the process flow web component object 124, 200 in the component database 120. In this regard, when a user of a client device 106 subsequently utilizes a web browser or similar browser application 108 to access or retrieve the URL associated with the web application, the browser application 108 retrieves or otherwise obtains the HTML file for the web page associated with the web application at that address from the network 110 and then parses or otherwise executes the HTML code to generate the web page GUI display associated with the web application within the browser application 108. When the browser application 108 encounters the reference to the process flow web component object 124, 200 in the component database 120, the browser application 108 transmits or otherwise provides a request to the application platform 104 and/or the page generator 150 over the network 110 to retrieve the process flow web component object 124, 200 in the component database 120. After retrieving the process flow web component object 124, 200, the browser application 108 and/or the page generator 150 parse or otherwise execute the presentation code 202, the behavioral code 204, and the component sequence metadata 206 to generate the web page GUI display(s) defined for the process flow and performing related actions in accordance with the configured component sequence metadata 206.

For example, referring to FIGS. 3-5, the browser application 108 and/or the page generator 150 initiates or otherwise performs the set values function defined by the configured set values functional component 310 before initiating or performing the account data retrieval action defined by the get account data action component 312 (e.g., by transmitting a request for the defined account data over the network 110 to a database system 130 defined as a data source for the get account data action component 312). After implementing or executing the initial web components 310, 312, the browser application 108 and/or the page generator 150 generates the account details web page GUI display within the browser application 108 corresponding to the configured account details display component 314, for example, by retrieving the configured telephone input component 124, 210 416 and any other configured web components 124, 210 incorporated into the configured account details display component 314 to populate the account details web page GUI display (e.g., as depicted in within the preview region 602 in FIG. 6). Thereafter, the browser application 108 responds to user actions or other client-side events in accordance with the behavioral code 204 associated with the process flow web component 124, 200 and/or the behavioral code 214 associated with the currently presented web components 124, 210, 314, 416 to dynamically update the web page GUI displays associated with the web application in real-time in accordance with the user-defined behaviors for the presented web components 124, 210, 314, 416 and the preceding and/or following configured web components 124, 210 identified by the configured component sequence metadata 206 for the process flow.

Referring now to FIGS. 10-15, and with continued reference to FIGS. 1-9, in one or more implementations, the visual process designer 140 is configurable to support a configurable aggregate action web component that may be added to the process flow editing region of a process flow builder GUI display to configure multiple different actions to be initiated, invoked, or otherwise executed in parallel or concurrently to one another during the process flow. In this regard, rather relying on a sequence of actions to be performed in a sequential or serial order, a developer user may configure the aggregate action web component to perform the actions in parallel to reduce latency and improve the user experience. The configurable aggregate action web component allows the user to declaratively define actions to be initiated in parallel by an end user's web browser application in a WYSIWYG manner. In exemplary implementations, the aggregate action web component is configurable to allow the user to define a desired GUI behavior during execution of the constituent actions that are associated with the aggregate action web component as well as defining different values or criteria for handling errors generated by a constituent action component, and without requiring any coding by the user to achieve the desired behavior. For purposes of explanation, and without limitation, the aggregate action web component may alternatively be referred to herein as an action block web component, an action block component, or variants thereof.

Referring to FIGS. 1-2, in exemplary implementations, the visual process designer 140 is configurable to automatically generate presentation and behavioral code 212, 214 for a configured action block web component 124, 210 (e.g., task 906) that results in the client-side web browser application 108 invoking the configured action web components 124, 210 associated with the action block web component 124, 210 in parallel with the desired GUI behavior and error handling configured by the developer user. In this regard, similar to the process flow web component 200, the metadata 216 associated with the configured action block web component 124, 210 identifies the configured action web components 124, 210 in the component database 120 that are associated with the configured action block web component 124, 210. Thus, the autogenerated presentation and behavioral code 212, 214 associated with the configured action block web component 124, 210 cause the web browser application 108 to retrieve the configured action web components 124, 210 and initiate or otherwise perform the actions associated with the configured action web components 124, 210 in parallel.

While the constituent actions associated with the action block web component 124, 210 are executing, the autogenerated presentation and behavioral code 212, 214 associated with the configured action block web component 124, 210 cause the web browser application 108 to update the web page GUI display within the browser application 108 in accordance with the desired configuration applied to the action block web component 124, 210 by the developer. For example, in some implementations, the action block web component 124, 210 may be configured to allow the browser application 108 invoking, executing, or otherwise implementing a configured process flow web component object 124, 200 that includes the action block web component 124, 210 (e.g., by the component sequence metadata 206 containing a reference to the configured action block web component 124, 210) to advance to the next configured web component 124, 210 identified by the component sequence metadata 206 without waiting for all of the actions associated with the action block web component 124, 210 to complete execution. In such implementations, the web page GUI display within the browser application 108 may dynamically and asynchronously update as one or more of the actions associated with the action block web component 124, 210 are completed and return response data to the browser application 108. That said, in other implementations, the action block web component 124, 210 may be configured to block the browser application 108 from advancing to the next configured web component 124, 210 identified by the component sequence metadata 206 until all of the actions associated with the action block web component 124, 210 to complete execution. In such implementations, the visual process designer 140 may allow the developer to configure one or more messages or other interstitial GUI display(s) to temporarily present to the end user within the browser application 108 until all of the actions associated with the action block web component 124, 210 complete execution.

Figure 10:
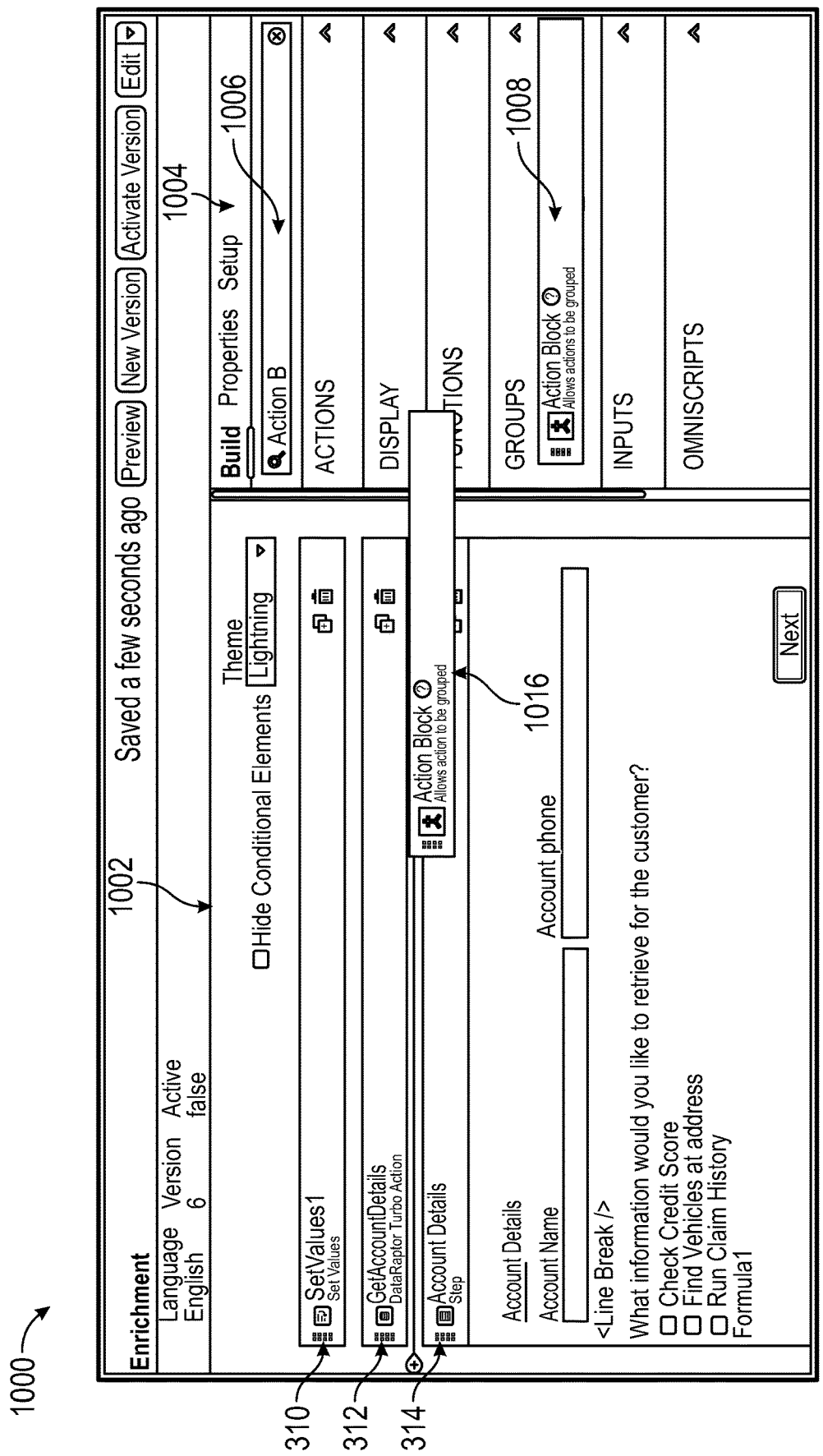
FIGS. 10-14 depict a sequence of web page graphical user interface (GUI) displays suitable for presentation on a client device by a visual process design service in the computing system of FIG. 1 according to some example implementations.

FIGS. 10-14 depict process flow builder GUI displays that may be generated by the visual process designer 140 within the browser application 108 at the client device 106 in accordance with one or more implementations in connection with a developer user adding an aggregate action web component (or action block web component) to a process flow defined within a process flow editing region. FIG. 10 depicts a state of a process flow builder GUI display 1000 in a design mode when a developer user is in the process of dragging an instance of a configurable action block web component 1016 from the component menu sidebar region 1004 and dropping it at a desired relative location between an existing sequence of components 310, 312, 314 within a process flow editing region 1002 of the process flow builder GUI display 1000. For example, in a similar manner as described above, a developer user may utilize a component lookup text box 1006 to search or otherwise query the component database 120 to identify a configurable action block component template 1008 and then drag an instance 1016 of the configurable action block component template 1008 to the process flow editing region 1002 for incorporation into the process flow.

Figure 11:
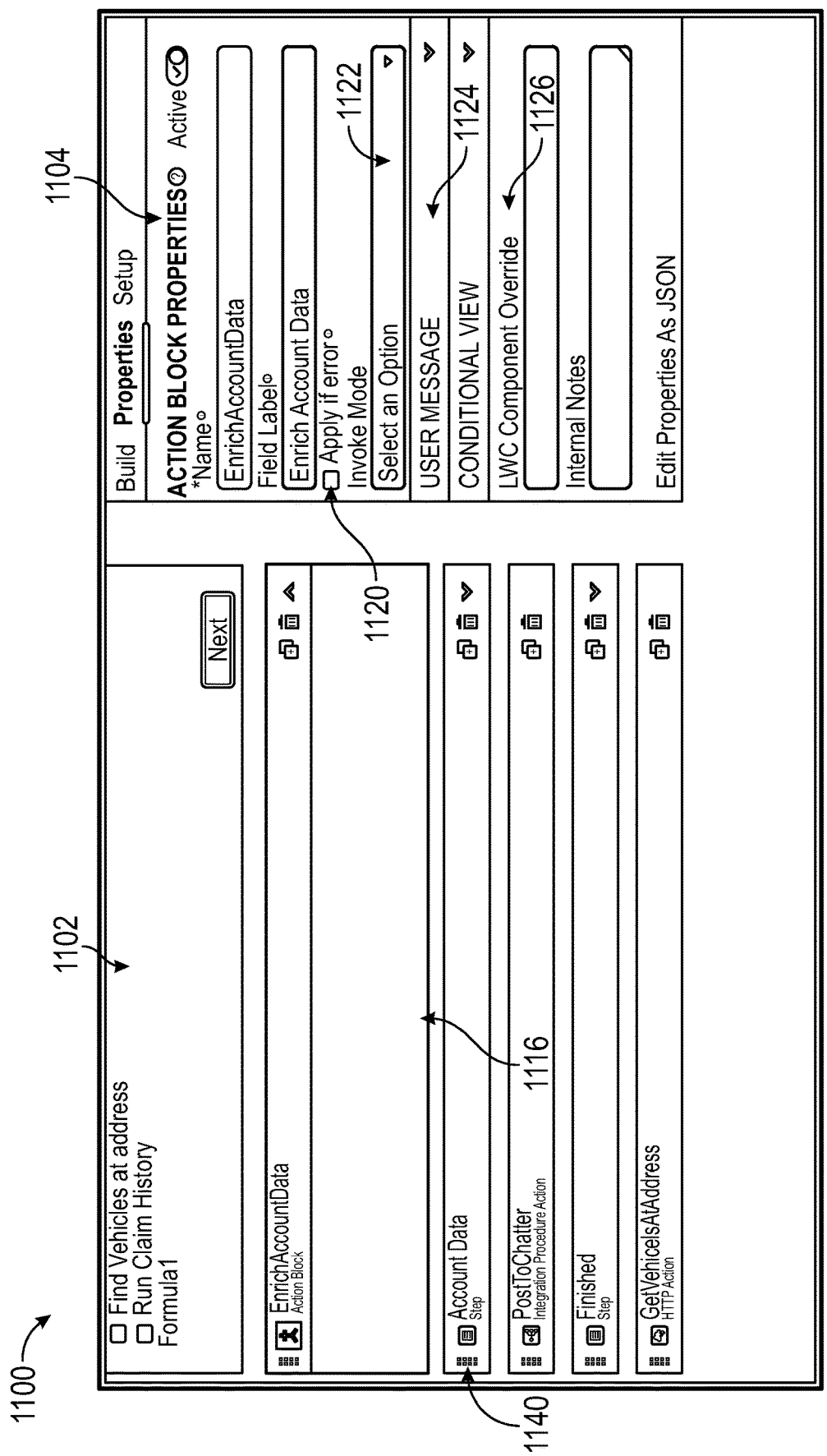

Referring now to FIG. 11, after dropping or otherwise adding the instance 1016 of the configurable action block component template 1006 to the process flow editing region 1002, an updated process flow builder GUI display 1100 is provided that includes a graphical representation of the configurable action block component 1116 at the dropped location where it was to be added within the process flow component sequence. As described in greater detail below, the graphical representation of the configurable action block component 1116 includes a region where instances of configurable action web components may be dragged and dropped in order to incorporate or otherwise associate those configurable action web components with the action block component 1116 for parallel execution. When the configurable action block component 1116 is selected, the updated process flow builder GUI display 1100 includes an action block component definition sidebar region 1104 that includes text boxes and other GUI elements that are configurable to allow the developer user to manually input or otherwise define values for the attributes, properties, or fields of metadata to be associated with the configured action block component 1116.

In the illustrated implementation, the action block component definition sidebar region 1104 includes a checkbox GUI element 1120 that is selectable by a user to configure the error handling behavior of the action block component 1116. For example, when the checkbox GUI element 1120 is selected to enable an "Apply if Error" configuration, the autogenerated code 212, 214 for the action block component 1116 is configured to allow data from one or more actions added to the action block component 1116 to be applied to the web page GUI display or subsequent components of the process flow even if one of the actions associated with the action block component 1116 generates an error. Conversely, when the checkbox GUI element 1120 is unselected, the autogenerated code 212, 214 for the action block component 1116 may be configured to generate an error message or other GUI display within the client web browser or otherwise prevent advancement to a subsequent component of the process flow if one of the actions associated with the action block component 1116 generates an error.

The illustrated action block component definition sidebar region 1104 also includes an "Invoke Mode" drop-down list (or picklist) GUI element 1122 that is selectable by a user to configure the GUI display behavior of the action block component 1116 during execution of the actions associated with the action block component 1116. In an exemplary implementation, the visual process designer 140 supports three different modes for the GUI display behavior for the action block component 1116 that are selectable by the developer user using the picklist GUI element 1122: a synchronous mode (or sync mode), a non-blocking mode, and a fire and forget mode.

User selection of the synchronous mode (or sync mode) configuration within the picklist GUI element 1122 results in the autogenerated code 212, 214 for the action block component 1116 being configured to block or prevent updating of the web page GUI display, updating the DOM for the web page, or advancing to the next component of the process flow by causing the web browser application 108 to wait until each of the constituent actions associated with the action block component 1116 have been completed and return JSON response data. The JSON response data returned by the constituent actions is merged and analyzed to identify any errors (in which case the error handling configuration indicated by the checkbox GUI element 1120 would be applied) before applying the JSON response data to the web page GUI display, the DOM for the web page, or a subsequent component of the process flow. In this regard, when one of the actions generates an error and the "Apply if Error" configuration is disabled, the action block component 1116 may be configured to cause the web browser application 108 to automatically generate an error message GUI display rather than updating the web page GUI display to reflect the JSON response data returned by the constituent actions. However, when the "Apply if Error" configuration is enabled, the action block component 1116 is configured to cause the web browser application 108 to update portions of the web page GUI display to reflect the JSON response data returned by the constituent actions that did not generate errors, while other portions of the web page GUI display may remain static or be automatically populated with an error message indicating a respective constituent action for rendering or populating a component within that portion of the web page GUI display generated an error or otherwise failed to return valid data.

User selection of a non-blocking mode configuration within the picklist GUI element 1122 results in the autogenerated code 212, 214 for the action block component 1116 allowing the JSON response data returned by each of the constituent actions to be asynchronously applied to the web page GUI display and/or the DOM for the web page when the JSON response data for the respective constituent action is available, while waiting for each of the constituent actions to complete before advancing to a subsequent component of the process flow. Thus, different components depicted on the web page GUI display may dynamically and asynchronously update while waiting for all of the constituent actions to be completed before advancing through the process flow. When one of the actions generates an error and the "Apply if Error" configuration is disabled, the action block component 1116 may be configured to cause the web browser application 108 to automatically generate an error message GUI display and/or cease updating the web page GUI display. However, when the "Apply if Error" configuration is enabled, the action block component 1116 is configured to allow the web browser application 108 to continue to asynchronously update portions of the web page GUI display to reflect the JSON response data returned by the constituent actions that did not generate errors, while other portions of the web page GUI display may remain static or be automatically populated with an error message indicating a respective constituent action for rendering or populating a component within that portion of the web page GUI display generated an error or otherwise failed to return valid data.

User selection of a fire and forget mode configuration within the picklist GUI element 1122 results in the autogenerated code 212, 214 for the action block component 1116 allowing the web browser application 108 to advance to the next component in the process flow component sequence without waiting for any of the constituent actions to complete or return JSON response data. Thus, after the web browser application 108 initiates the concurrent or parallel execution of the constituent actions associated with an action block component 1116 configured for a fire and forget mode, the web browser application 108 may automatically retrieve and implement the next configured web component 124, 210 following the configured action block component 124, 210, 1116 identified by the component sequence metadata 206 for the process flow web component 124, 200 associated with the web page GUI display independent of the outcome of the constituent actions and without waiting on any one of the constituent actions to complete execution. Thus, for a fire and forget configuration, the process flow may continue regardless of whether one or more actions associated with the action block component 124, 210, 1116 generate an error.

Still referring to FIG. 11, the illustrated action block component definition sidebar region 1104 includes a user message region 1124 that, when expanded, includes one or more text boxes or other GUI elements that are selectable or manipulable by a developer user to define different user messages that may be generated or otherwise provided within the web browser application 108 in connection with execution of the action block web component 1116. For example, the GUI elements may allow the developer user to define the content, type and/or visual characteristics of an interstitial GUI display to be presented while the constituent actions are being executed (e.g., in a synchronous mode or other GUI display blocking configuration) to inform a client end user that the process flow is waiting for response data from one or more actions before updating the web page GUI display. Similarly, the GUI elements may allow the developer user to define the content, type and/or visual characteristics of an error message GUI display to be presented when one of the constituent actions generates an error. For example, depending on the desired configuration selected by the developer user, the error message GUI display may be realized as a pop-up window that overlies the previous state of the web page GUI display, the error message GUI display may be presented in lieu of the web page GUI display, or the error message GUI display may be presented within a particular portion of the web page GUI display (e.g., in a region of the web page GUI display to be populated or rendered based on JSON response data from the error-generating action).

The illustrated action block component definition sidebar region 1104 includes a conditional view region 1126 that allows the developer user to add and define one or more conditions or criteria that control whether or not the action block component should be executed. For example, if the action block provided on a step of the process flow (e.g., by adding the action block to a GUI display component), it may be rendered as a button or similar selectable GUI element, depending on whether or not a show/hide condition is satisfied. If the show/hide condition is "userProfile=System Administrator," then the button or GUI element corresponding to the action block component will only be rendered on the GUI display if the "userProfile" node in the data JSON has a value equal to "System Administrator." Similarly, if the action block component is provided within the process flow between steps or GUI display components, the conditions may be utilized to determine whether or not it will automatically execute when the user transitions between the steps of the process flow.

Figure 12:
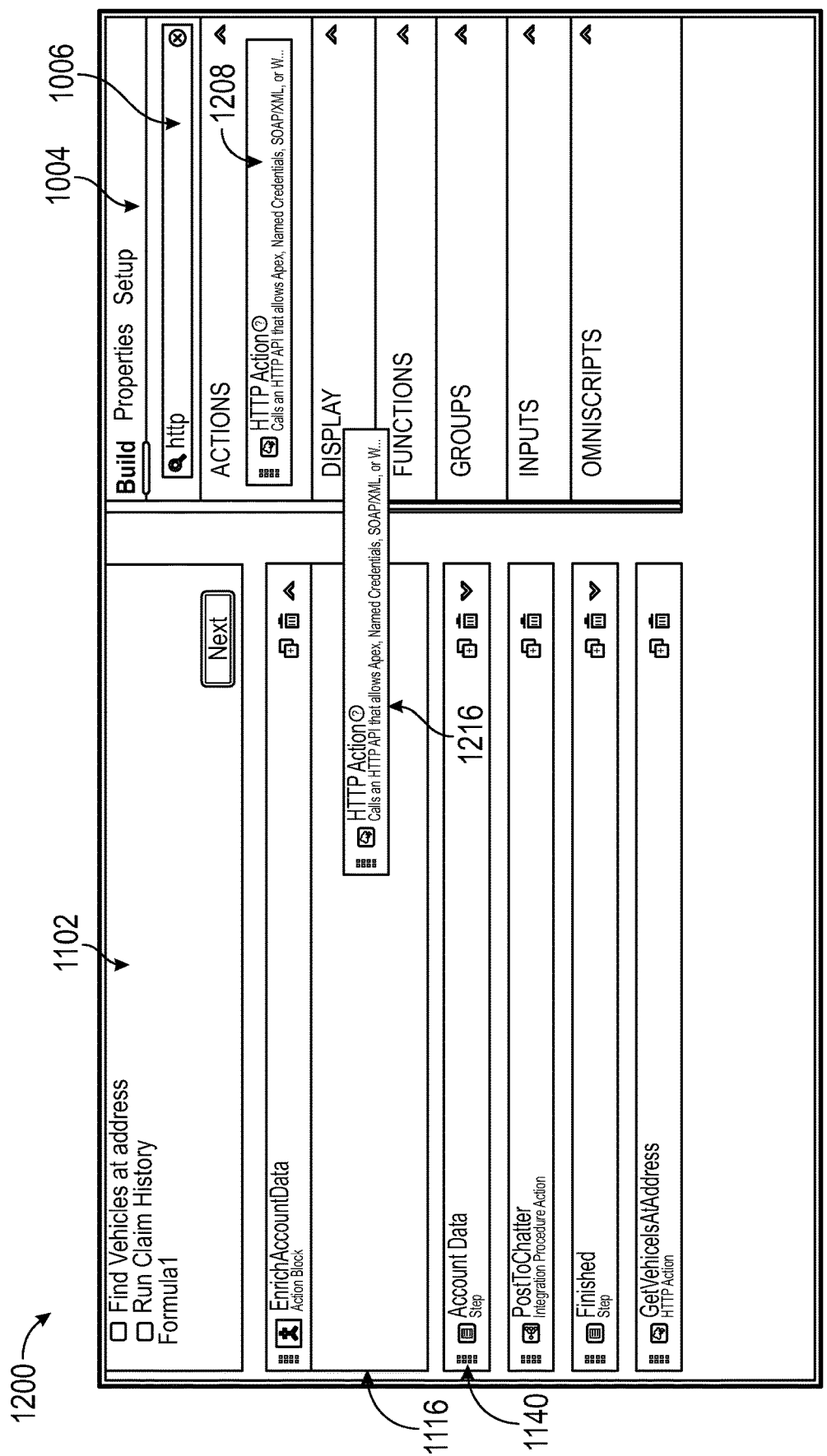
Figure 13:
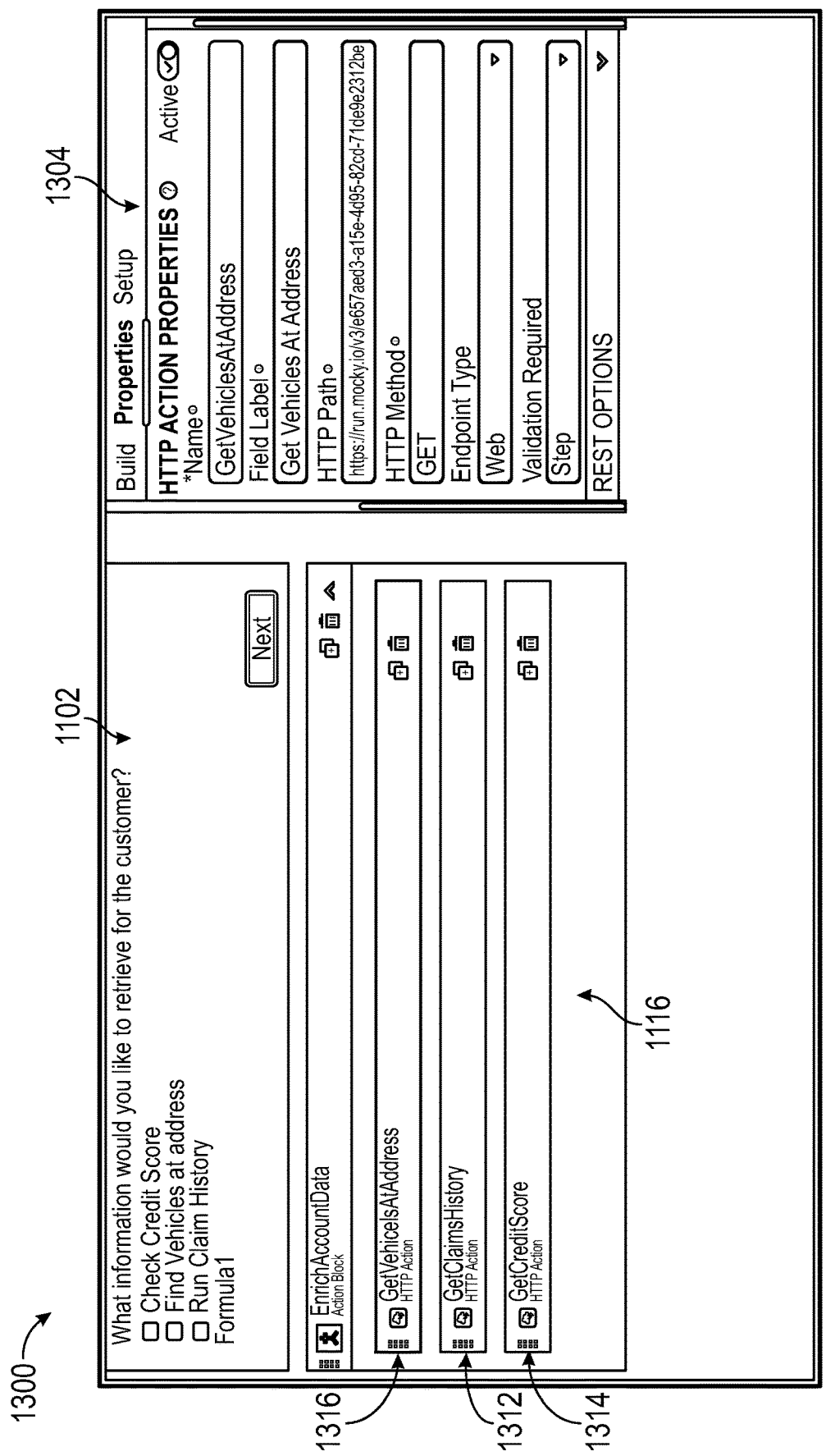

Turning now to FIGS. 12-13, the visual process designer 140 allows a user to add constituent actions to the action block component 1116 in a visual, WYSIWYG, drag and drop manner using the process flow builder GUI display 1200. As described above, a developer user may utilize the component lookup text box 1006 in the component menu sidebar region 1004 to search for configurable action component templates 122 that can be dragged and dropped into the action block component 1116 to add server side actions (e.g., invoking Apex code, invoking a REST API call or SOAP API call from a server, invoking a REST API from a web browser) to be run automatically in connection with the action block component 1116 between display components within the process flow editing region 1102. For example, in the illustrated implementation, in response to a user inputting a search string in the component lookup text box 1006, the visual process designer 140 queries the component database 120 using the input search string to identify an HTTP request component template 1208 for presentation within the action region of the component menu sidebar region 1004. In this regard, FIG. 12 depicts a state of the process builder GUI display 1200 when a developer user is in the process of dragging an instance 1216 of the configurable HTTP request component template 1208 from the component menu sidebar region 1004 and dropping the configurable HTTP request component at a location within the action block component 1116.

Referring now to FIG. 13, after dropping or otherwise adding the instance 1216 of the configurable HTTP request component template 1208 within the configurable action block component 1116 in the process flow editing region 1102, an updated process flow builder GUI display 1300 is provided that includes a graphical representation of the configurable action component 1316 within the action block component 1116. When the configurable HTTP request component 1316 is selected, the process flow builder GUI display 1300 includes an HTTP request component definition sidebar region 1304 that includes text boxes, drop-down lists (or picklists) and other GUI elements that are configurable to allow the developer user to manually input or otherwise define values for the attributes, properties, or fields of metadata to be associated with the configured HTTP request component 1316. For example, as shown, the HTTP request component definition sidebar region 1304 may include GUI elements for manually defining a name to be assigned to the configured HTTP request component 1316, a URL, path, or other network address or for a REST API or other endpoint to be associated with the HTTP request (e.g., "HTTP Path"), a request method type associated with the HTTP request (e.g., GET, POST, PUT, etc.), and the like. In this regard, the HTTP request component 1316 may be configured to request or retrieve data from an external database system 130 or any other suitable location on a network 110. In the illustrated implementation of FIG. 13, the configured action block component 1116 includes three configured HTTP request components 1312, 1314, 1316 that have been added to the action block component 1116 for execution in parallel.

Figure 14:
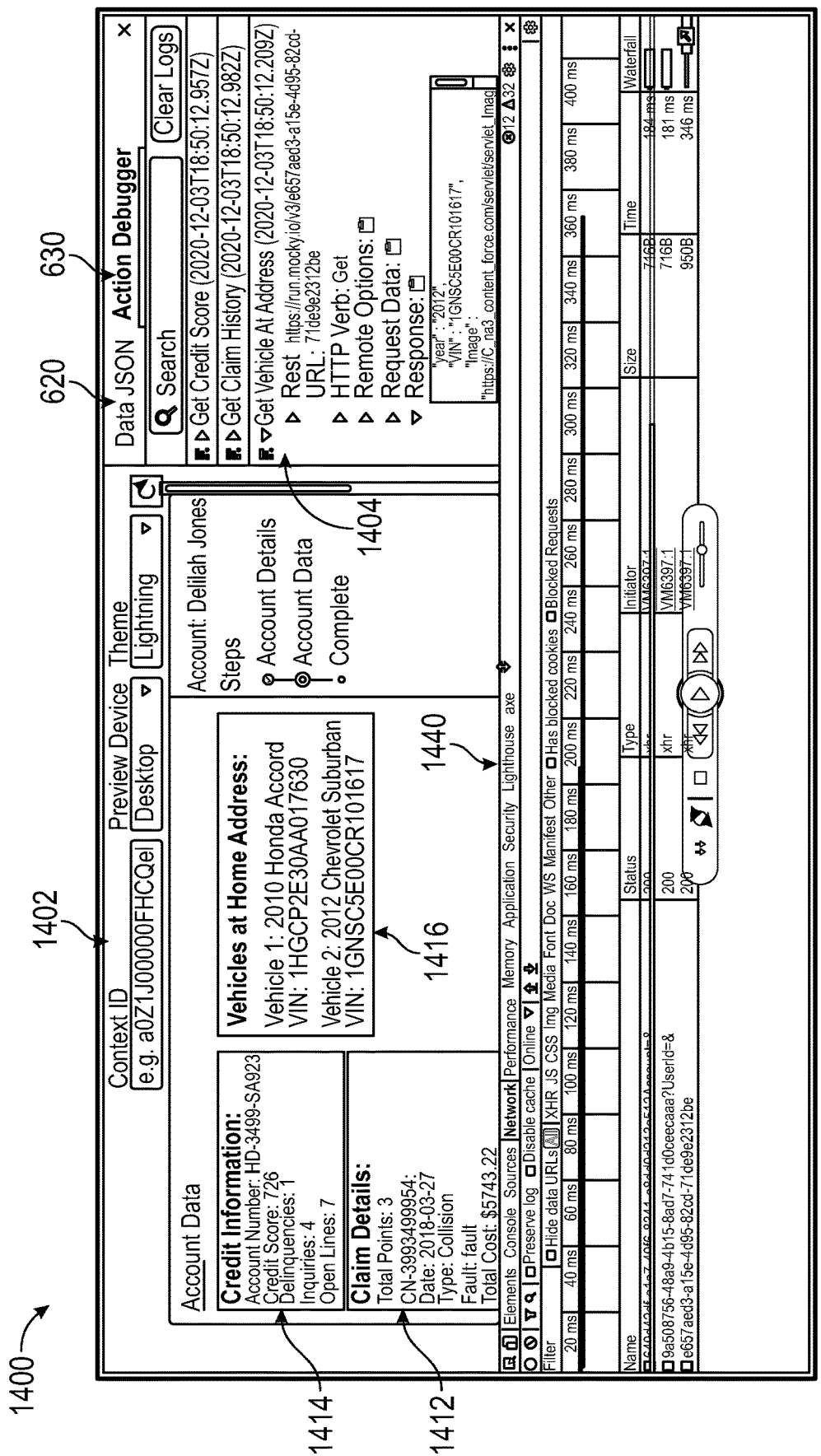

Referring to FIG. 14, and with continued reference to FIGS. 10-13, in a similar manner as described above in the context of FIGS. 3-8, in response to user selection of a mode selection GUI element, the visual process designer 140 may transition from a design mode of the process flow builder GUI display depicted in FIGS. 10-13 to a preview mode of the process flow builder GUI display 1400 depicted in FIG. 14. The depicted process flow builder GUI display 1400 in the preview mode corresponds to the rendering and execution of the process flow web component 200 corresponding to the process flow depicted in the process flow editing region in FIGS. 10-13, and in particular, corresponds to the presentation or rendering of the "Account Data" display component 1140 and the resulting web page GUI display after invocation or execution of the configured action block web component 1116 (and the configured constituent action web components 1312, 1314, 1316 associated therewith). For example, the Account Data display component 1140 may include text block display web components 1412, 1414, 1416 that are automatically populated with the response data returned by the action web components 1312, 1314, 1316 based on the JSON data maintained in the browser DOM (e.g., by the user configuring the display web components 1412, 1414, 1416 to reference particular JSON keys corresponding to the responses from the action web components 1312, 1314, 1316 to retrieve values for display that are set by the action web components 1312, 1314, 1316). The debugging sidebar region 1404 displays information pertaining to the execution or result of the actions, depending on whether the data JSON tab or the action debugging tab is selected, in a similar manner as described above. In this regard, the developer user may utilize the preview mode to review the JSON response data resulting from performance of the different parallel actions associated with the action block web component 1116 and other data or information pertaining to the client-side and/or server-side actions performed at or before the current state of the process flow currently depicted.

Still referring to FIG. 14, the illustrated preview mode of the process flow builder GUI display 1400 includes a performance analysis region 1440 that allows the user to review one or more performance characteristics associated with the action block web component 1116. For example, the illustrated performance analysis region 1440 includes a waterfall chart that illustrates when the individual action web components 1312, 1314, 1316 were initiated and the respective durations of time required for each of the action web components 1312, 1314, 1316 to return response data. In this regard, FIG. 14 depicts a scenario where two of the action components associated with the action block were initiated and performed concurrently while a third action component was initially stalled or rejected by the URL associated with the HTTP GET request and subsequently initiated and performed after one of the other HTTP GET request action components completed. However, by virtue of the HTTP GET requests being performed in parallel, assuming each request requires substantially the same duration of time for completion, the overall latency associated with performing the actions associated with the action block may be reduced by a factor of one third (in the situation where one action is stalled or rejected) to two thirds (in the situation where all three actions are allowed to execute in parallel). In this regard, adding actions to the action block web component for performance in parallel reduces the latency associated with the process flow (e.g., between GUI display updates) and improves the user experience.

As described above in the context of FIGS. 1-9, after a developer user adds an action block web component to a process flow, configures the action block web component, and adds and configures constituent action web components associated with the action block web component, the visual process designer 140 is configurable to automatically generate the presentation code and behavioral code for implementing the configured action block web component and the constituent action web components, and updates the process flow component sequence metadata 206 to include a reference to the configured action block web component at the user's desired relative location within the process flow. For example, as described above, for each configured constituent HTTP request component 1312, 1314, 1316, the visual process designer 140 automatically generates the presentation code 212 and/or the behavioral code 214 for performing the respective HTTP request in accordance with the user-defined values or other metadata 216 associated with the respective HTTP request, and stores or otherwise maintains a corresponding configured HTTP request web component 124, 210 in the component database 120 for each of the HTTP request components 1312, 1314, 1316. The visual process designer 140 also automatically generates presentation code 212 and/or the behavioral code 214 configurable to cause a web browser application 108 to invoke the configured HTTP request web components 124, 210 referenced by the action block web component metadata 216 and perform the corresponding HTTP request actions in parallel in accordance with the user-defined values or metadata for the desired GUI display behavior and error handling behavior for the action block web component 1116. The visual process designer 140 stores or otherwise maintains the configured action block web component 124, 210 in the component database 120 and updates the component sequence metadata 206 for the configured process flow web component 124, 200 to refer to the configured action block web component 124, 210 in the component database 120 at the desired relative location or order within the process flow component sequence defined within the process flow editing region.

Figure 15:
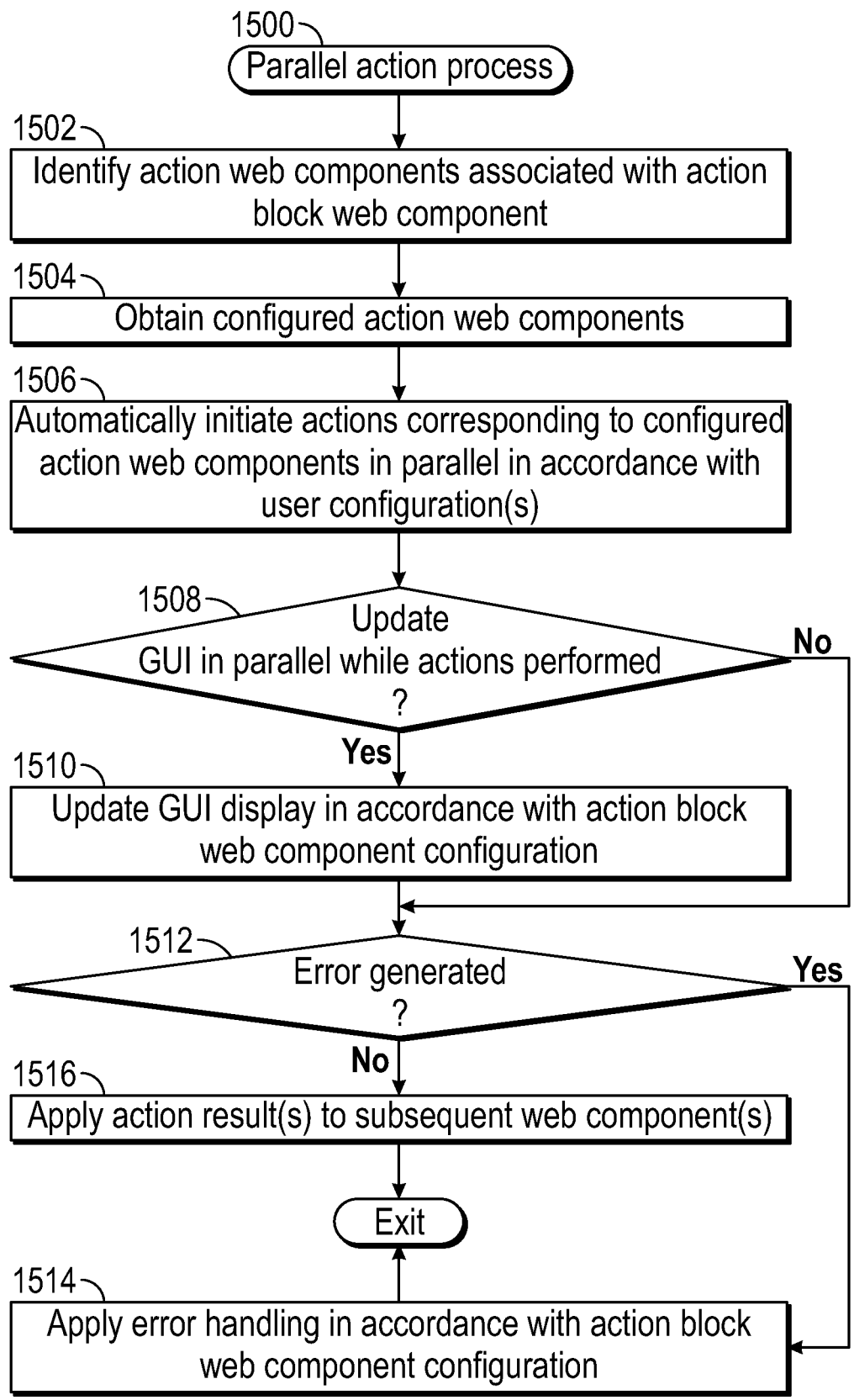
FIG. 15 is a flow diagram illustrating a parallel action process suitable for use in connection with a visual process design service in the computing system according to some example implementations.

FIG. 15 depicts an exemplary parallel action process 1500 that may be implemented or otherwise performed in connection with an aggregate action web component (or action block web component) that is incorporated within a process flow web component. For illustrative purposes, the following description may refer to elements mentioned above in connection with FIG. 1. In this regard, while portions of the parallel action process 1500 may be performed by different elements of the computing system 100, for purposes of explanation, the subject matter is described herein in the context of the parallel action process 1500 being primarily performed by the client application 108. It should be appreciated that the parallel action process 1500 may include any number of additional or alternative tasks, the tasks need not be performed in the illustrated order and/or the tasks may be performed concurrently, and/or the parallel action process 1500 may be incorporated into a more comprehensive procedure or process having additional functionality not described in detail herein. Moreover, one or more of the tasks shown and described in the context of FIG. 15 could be omitted from a practical implementation of the parallel action process 1500 as long as the intended overall functionality remains intact.

In an exemplary implementation, the parallel action process 1500 is initiated or otherwise performed by a web browser application during execution of a process flow in response to encountering an action block web component within the process flow web component sequence. For example, the JavaScript or other behavioral code associated with the process flow web component and/or the action block web component may be configurable to cause the web browser application to automatically perform the parallel action process 1500. The parallel action process 1500 initializes by identifying the action web components associated with the action block web component, retrieving or otherwise obtaining the configured action web components from a database, and automatically initiating the actions associated with the configured action web components in parallel with one another (tasks 1502, 1504, 1506). In this regard, the autogenerated code 212, 214 associated with the action block web component 124, 210 may be configurable to cause the browser application 108 to utilize the action block metadata 216 to identify and retrieve the configured action web components 124, 210 associated with the action block web component 124, 210 from the component database 120. For each configured action web components 124, 210, the browser application 108 executes the respective autogenerated code 212, 214 associated therewith to initiate the respective action in accordance with the user-defined metadata values 216 that define the action. In one implementation, the browser application 108 maintains the user configuration of the action block web component in a JSON object definition of the action block web component and utilizes the action block metadata to obtain and maintain the user configuration settings and/or other definition information for the constituent actions within the JSON object definition of the action block web component. At run-time, the browser application 108 executes or otherwise invokes the JSON object definition of the action block web component to perform and render the result of each of the constituent actions in accordance with the user configuration of the action block web component.

After initiating the constituent actions for the action block, the parallel action proces s 1500 continues by determining whether the user configuration for the action block allows for the web page GUI display to be dynamically updated concurrently to performance of the constituent actions, and if so, dynamically updates the web page GUI display in accordance with the user configuration (tasks 1508, 1510). In this regard, as described above in the context of FIGS. 10-14, depending on the user configuration of the GUI display behavior designated using the Invoke Mode picklist 1122, the web browser application 108 may invoke a subsequent display web component 1140 of the process flow while actions associated with the action block web component 1116 are performed. For example, as described above, when the action block web component 1116 is configured for a non-blocking invoke mode, the autogenerated code 212, 214 associated with the action block web component 124, 210, 1116 causes the web browser application 108 to advance to the subsequent display web component 1140 after invoking and initiating the configured action web components 1312, 1314, 1316 without waiting for JSON response data to be returned for each of the action web components 1312, 1314, 1316. In this regard, the browser application 108 may automatically initiate rendering of the Account Data display component 1140 and its constituent display web components 1412, 1414, 1416 as depicted in FIG. 14, with the contents of the constituent display web components 1412, 1414, 1416 dynamically and asynchronously updating as JSON data maintained in the browser DOM is updated or changes. For example, when execution of the HTTP GET request associated with the GetVehiclesAtAddress action component 1316 sets one or more JSON keys associated with the vehicle information in the DOM of the browser application 108 to the response data received via the network 110 (e.g., from database system 130), the corresponding Vehicles at Home Address display component 1416 may dynamically and asynchronously updated to reflect the response data from the GetVehiclesAtAddress action component 1316 independent of whether or not the other action components 1312, 1314 have returned data. Thus, the display component 1416 may be rendered or updated before or after the display components 1412, 1414 associated with the other action components 1312, 1314, depending on whether the HTTP GET request associated with the GetVehiclesAtAddress action component 1316 returns data quicker or slower than the HTTP GET requests associated with the other action components 1312, 1314.

Referring again to FIG. 15 with continued reference to FIGS. 10-14, the parallel action process 1500 continues by identifying or otherwise determining whether one or more of the constituent actions associated with the action block generated an error, and if so, responding to the error by applying the user-configured error handling behavior associated with the action block (tasks 1512, 1514). In the absence of an error (or for a fire and forget configuration), the parallel action process 1500 applies the response data or other results of the constituent actions to one or more subsequent web components of the process flow by advancing through remaining sequence of components associated with the process flow (task 1516). For example, when the Apply if Error configuration is disabled and the Invoke mode is set to a synchronous mode, the autogenerated code 212, 214 associated with the action block web component 124, 210, 1116 causes the web browser application 108 to generate or otherwise provide an error message GUI display or other error notification on the client device 106 in lieu of advancing and/or rendering the subsequent display web component 1140. On the other hand, when the Apply if Error configuration is enabled, the autogenerated code 212, 214 associated with the action block web component 124, 210, 1116 allows the web browser application 108 to advance and/or render the subsequent display web component 1140 while generating or otherwise providing an error message or other error notification on the client device 106 according to the user's desired error configuration. For example, if the Apply if Error configuration is enabled via the checkbox 1120 and the HTTP GET request associated with the GetVehiclesAtAddress action component 1316 returns an error, the browser application 108 may fail to populate the display web component 1416 or render an error message within the corresponding portion of the web page GUI display in place of the display web component 1416 while rendering and/or populating the remaining components 1412, 1414 using the JSON response data returned by their respective HTTP request action components 1312, 1314. When the Apply if Error configuration is enabled and/or no error is generated, the JSON data of the DOM associated with the web page GUI display reflects the successfully completed actions, thereby allowing the result(s) of the successful action(s) to influence subsequent display components or other components associated with the process flow web component sequence 206 in accordance with the user's desired configuration of those subsequent components.

In one or more implementations, the configured web components 124, 200, 210 for implementing a process flow web component including an action block web component defined using the visual process designer 140 may be deployed to the database system 130 or other locations on a network 110 for implementation or incorporation within a web page of a web application supported by another computing system or platform independent of the application server 102 and/or the component database 120, such as, for example, by the application platform 136 provided by the application server 132 of the database system 130. For example, the configured web components 124, 200, 210 may be instantiated or otherwise created as database objects 138 in the database 134 to be incorporated in a web page of a virtual application supported by the application platform 136 (e.g., by modifying or updating code of the web page to invoke or refer to the deployed process flow web component). Continuing the example described above, when a browser application 108 accesses, executes or otherwise renders the web page associated with a virtual application supported by the application platform 136, the browser application 108 may utilize the configured HTTP GET requests associated with the action components 1312, 1314, 1316 to retrieve values from different fields of an account object 138 in the database 134, with the associated display components 1412, 1414, 1416 of the web page being configured to cause a browser application 108 to render or otherwise display those account object field values on the web page GUI display in accordance with the user configuration of the action block web component. It should be noted the web components 124, 200, 210 may be configured responsively to support any number of different types of application platforms or deployments, including, but not limited to, desktop web applications, mobile applications, desktop mobile applications, and/or the like.

Figure 16A:
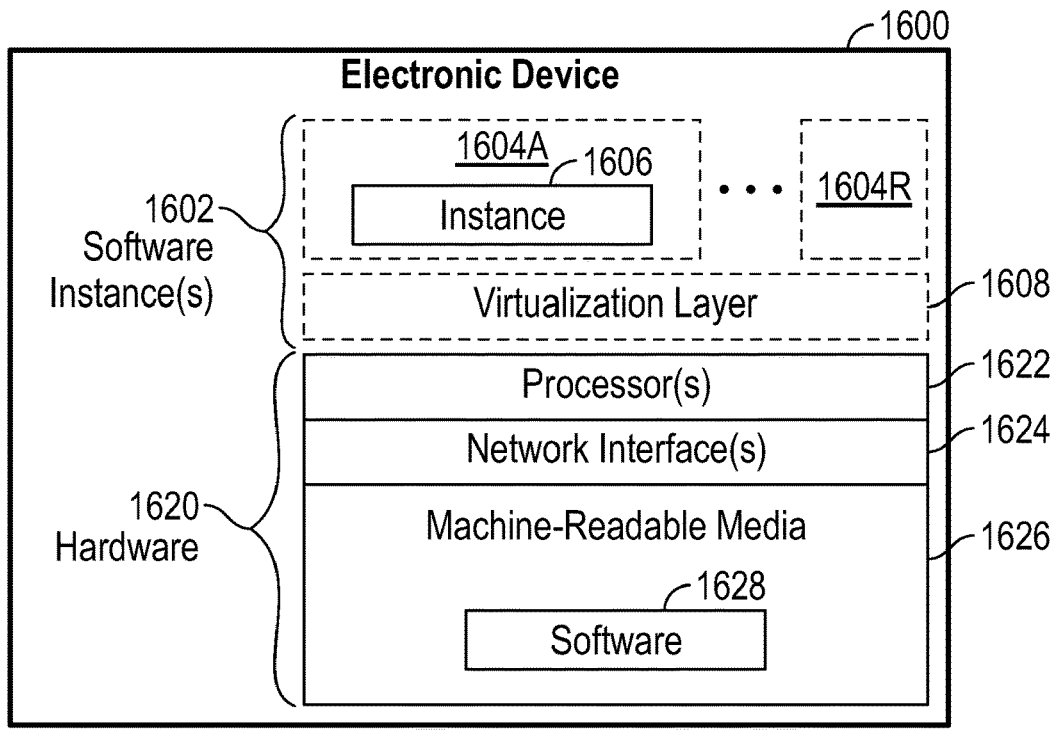
FIG. 16A is a block diagram illustrating an electronic device according to some example implementations.
Figure 16B:
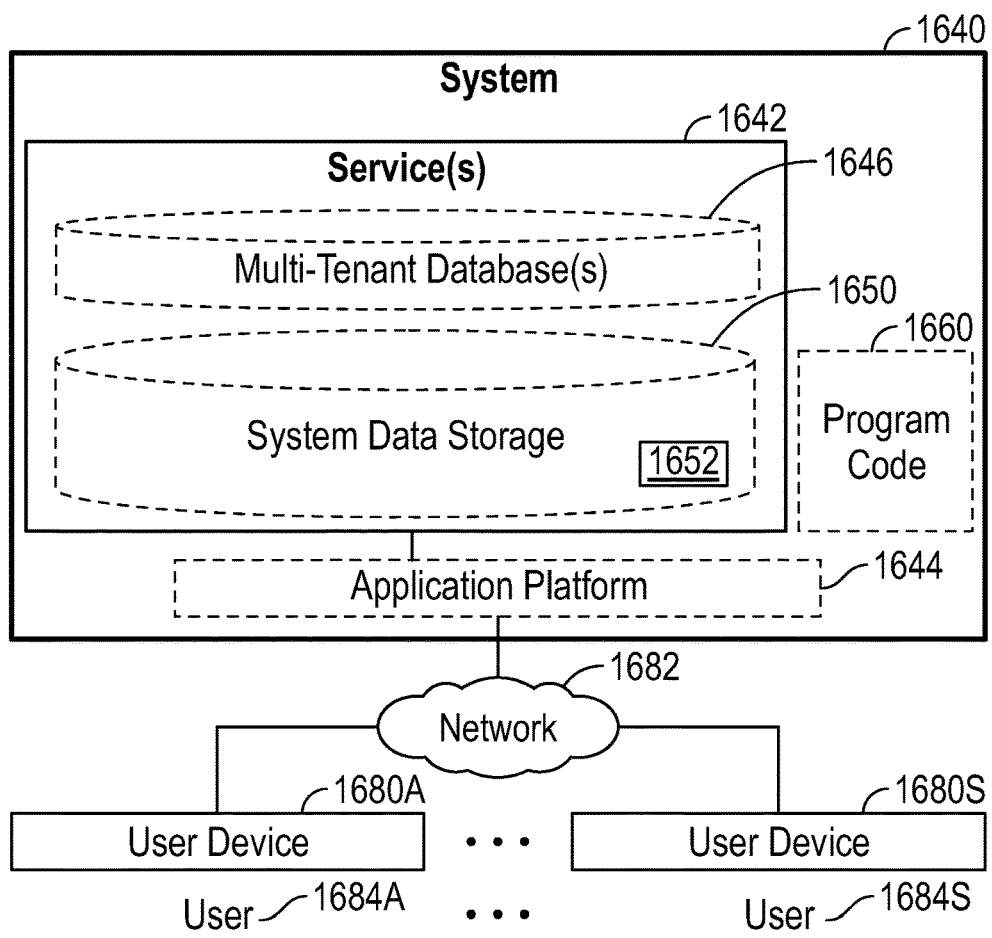
FIG. 16B is a block diagram of a deployment environment according to some example implementations.

Referring now to FIGS. 16A-16B, one or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

FIG. 16A is a block diagram illustrating an electronic device 1600 according to some example implementations. FIG. 16A includes hardware 1620 comprising a set of one or more processor(s) 1622, a set of one or more network interfaces 1624 (wireless and/or wired), and machine-readable media 1626 having stored therein software 1628 (which includes instructions executable by the set of one or more processor(s) 1622). The machine-readable media 1626 may include non-transitory and/or transitory machine-readable media. Each of the previously described clients and the visual process design service may be implemented in one or more electronic devices 1600. In one implementation: 1) each of the clients is implemented in a separate one of the electronic devices 1600 (e.g., in end user devices where the software 1628 represents the software to implement clients to interface directly and/or indirectly with the visual process design service (e.g., software 1628 represents a web browser, a native client, a portal, a command-line interface, and/or an application programming interface (API) based upon protocols such as Simple Object Access Protocol (SOAP), Representational State Transfer (REST), etc.)); 2) the visual process design service is implemented in a separate set of one or more of the electronic devices 1600 (e.g., a set of one or more server devices where the software 1628 represents the software to implement the visual process design service); and 3) in operation, the electronic devices implementing the clients and the visual process design service would be communicatively coupled (e.g., by a network) and would establish between them (or through one or more other layers and/or or other services) connections for submitting authorization requests to the visual process design service and returning access tokens to the clients. Other configurations of electronic devices may be used in other implementations (e.g., an implementation in which the client and the visual process design service are implemented on a single one of electronic device 1600).

During operation, an instance of the software 1628 (illustrated as instance 1606 and referred to as a software instance; and in the more specific case of an application, as an application instance) is executed. In electronic devices that use compute virtualization, the set of one or more processor(s) 1622 typically execute software to instantiate a virtualization layer 1608 and one or more software container(s) 1604A-704R (e.g., with operating system-level virtualization, the virtualization layer 1608 may represent a container engine (such as Docker Engine by Docker, Inc. or rkt in Container Linux by Red Hat, Inc.) running on top of (or integrated into) an operating system, and it allows for the creation of multiple software containers 1604A-704R (representing separate user space instances and also called virtualization engines, virtual private servers, or jails) that may each be used to execute a set of one or more applications; with full virtualization, the virtualization layer 1608 represents a hypervisor (sometimes referred to as a virtual machine monitor (VMM)) or a hypervisor executing on top of a host operating system, and the software containers 1604A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1628 is executed within the software container 1604A on the virtualization layer 1608. In electronic devices where compute virtualization is not used, the instance 1606 on top of a host operating system is executed on the "bare metal" electronic device 1600. The instantiation of the instance 1606, as well as the virtualization layer 1608 and software containers 1604A-704R if implemented, are collectively referred to as software instance(s) 1602.

Alternative implementations of an electronic device may have numerous variations from that described above. For example, customized hardware and/or accelerators might also be used in an electronic device.

FIG. 16B is a block diagram of a deployment environment according to some example implementations. A system 1640 includes hardware (e.g., a set of one or more server devices) and software to provide service(s) 1642, including the visual process design service. In some implementations the system 1640 is in one or more datacenter(s). These datacenter(s) may be: 1) first party datacenter(s), which are datacenter(s) owned and/or operated by the same entity that provides and/or operates some or all of the software that provides the service(s) 1642; and/or 2) third-party datacenter(s), which are datacenter(s) owned and/or operated by one or more different entities than the entity that provides the service(s) 1642 (e.g., the different entities may host some or all of the software provided and/or operated by the entity that provides the service(s) 1642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1640 is coupled to user devices 1680A-380S over a network 1682. The service(s) 1642 may be on-demand services that are made available to one or more of the users 1684A-384S working for one or more entities other than the entity which owns and/or operates the on-demand services (those users sometimes referred to as outside users) so that those entities need not be concerned with building and/or maintaining a system, but instead may make use of the service(s) 1642 when needed (e.g., when needed by the users 1684A-384S). The service(s) 1642 may communicate with each other and/or with one or more of the user devices 1680A-380S via one or more APIs (e.g., a REST API). In some implementations, the user devices 1680A-380S are operated by users 1684A-384S, and each may be operated as a client device and/or a server device. In some implementations, one or more of the user devices 1680A-380S are separate ones of the electronic device 1600 or include one or more features of the electronic device 1600.

In some implementations, the system 1640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1640 may include an application platform 1644 that enables PAAS for creating, managing, and executing one or more applications developed by the provider of the application platform 1644, users accessing the system 1640 via one or more of user devices 1680A-380S, or third-party application developers accessing the system 1640 via one or more of user devices 1680A-380S.

In some implementations, one or more of the service(s) 1642 may use one or more multi-tenant databases 1646, as well as system data storage 1650 for system data 1652 accessible to system 1640. In certain implementations, the system 1640 includes a set of one or more servers that are running on server electronic devices and that are configured to handle requests for any authorized user associated with any tenant (there is no server affinity for a user and/or tenant to a specific server). The user devices 1680A-380S communicate with the server(s) of system 1640 to request and update tenant-level data and system-level data hosted by system 1640, and in response the system 1640 (e.g., one or more servers in system 1640) automatically may generate one or more Structured Query Language (SQL) statements (e.g., one or more SQL queries) that are designed to access the desired information from the multi-tenant database(s) 1646 and/or system data storage 1650.

In some implementations, the service(s) 1642 are implemented using virtual applications dynamically created at run time responsive to queries from the user devices 1680A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1644 includes an application setup mechanism that supports application developers' creation and management of applications, which may be saved as metadata by save routines. Invocations to such applications, including the visual process design service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1640 and the user devices 1680A-380S.

Each user device 1680A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1640. For example, the user interface device can be used to access data and applications hosted by system 1640, and to perform searches on stored data, and otherwise allow one or more of users 1684A-384S to interact with various GUI pages that may be presented to the one or more of users 1684A-384S. User devices 1680A-380S might communicate with system 1640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1680A-380S might include an HTTP client, commonly referred to as a "browser," for sending and receiving HTTP messages to and from server(s) of system 1640, thus allowing users 1684A-384S of the user devices 1680A-380S to access, process and view information, pages and applications available to it from system 1640 over network 1682.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method comprising:
    identifying a plurality of configured actions added to a region on a graphical user interface (GUI) display at a client device corresponding to an aggregate action component;
    automatically generating configured code for each configured action of the plurality of configured actions in accordance with a respective configuration of the respective configured action of the plurality of configured actions;
    identifying a configuration associated with the aggregate action component;
    automatically generating aggregate action component code for a browser application initiating the configured code for each configured action of the plurality of configured actions in parallel in accordance with the configuration associated with the aggregate action component;

automatically generating process flow code including a first reference to the aggregate action component code in accordance with a sequence defined for a web page;

creating an aggregate action web component object in a database to maintain an association between the aggregate action component code and first metadata identifying the configured code for each configured action of the plurality of configured actions; and creating a process flow web component object in the database to maintain a second association between the process flow code and second metadata identifying a sequence of configured components within the GUI display, wherein:

the sequence of configured components includes the aggregate action component; and the second metadata includes the first reference to the aggregate action web component object in accordance with the sequence.

2. The method of claim 1, further comprising updating code for the web page to include a second reference to the process flow web component object in the database.

3. The method of claim 2, further comprising identifying a user configuration of a GUI element on the GUI display corresponding to a GUI display behavior for the aggregate action component, wherein the aggregate action component code is configurable to cause the browser application to dynamically update a web page GUI display for the web page by invoking a subsequent configured component of the sequence of configured components without waiting for response data from any one of the plurality of configured actions.

4. The method of claim 1, wherein:

automatically generating the configured code for each configured action of the plurality of configured actions comprises, for each configured action of the plurality of configured actions:

automatically generating the configured code for performing a respective action with respect to a network address identified by the respective configuration of the respective configured action; and creating a respective configured action web component object in the database to maintain the configured code; and the first metadata comprises a respective reference to the respective configured action web component object for each configured action of the plurality of configured actions.

5. The method of claim 1, further comprising identifying a user configuration of a GUI element on the GUI display corresponding to an error handling for the aggregate action component, wherein the aggregate action component code is configurable to cause the browser application to respond to an error generated by at least one of the plurality of configured actions in accordance with the user configuration of the GUI element.

6. The method of claim 5, wherein the aggregate action component code comprises behavioral code configurable to cause the browser application to update at least a portion a web page GUI display for the web page in response to response data returned by one or more actions of the plurality of configured actions when the user configuration of the GUI element enables the response data to be applied when the error is generated.

7. The method of claim 1, further comprising identifying a user configuration of a GUI element on the GUI display corresponding to a GUI display behavior for the aggregate action component, wherein the aggregate action component code is configurable to cause the browser application to dynamically update a web page GUI display for the web page in response to data returned by at least one of the plurality of configured actions in accordance with the user configuration of the GUI element.

8. The method of claim 7, wherein the aggregate action component code comprises behavioral code configurable to cause the browser application to asynchronously update the web page GUI display for the web page in response to respective response data returned by each respective action of the plurality of configured actions when the user configuration of the GUI element corresponds to a non-blocking mode.

9. A non-transitory machine-readable storage medium that provides instructions that, when executed by a processor, are configurable to cause said processor:

provide a process flow builder graphical user interface (GUI) display at a client device over a network, wherein the process flow builder GUI display comprises a menu of configurable components for integration in a web page;

obtain, from the process flow builder GUI display, a plurality of configured action components from the menu of configurable components added to a region on the process flow builder GUI display corresponding to an aggregate action component;

generate configured code for each configured action of the plurality of configured action components in accordance with a respective configuration of the respective configured action of the plurality of configured action components;

identify a configuration associated with the aggregate action component;

generate aggregate action component code configurable to cause a browser application to initiate the configured code for each configured action of the plurality of configured action components in parallel in accordance with the configuration associated with the aggregate action component;

generate process flow code corresponding to a sequence of configured components within process flow builder GUI display, wherein the sequence of configured components includes the aggregate action component and the process flow code includes reference to the aggregate action component code in accordance with the sequence of configured components;

create an aggregate action web component object in a database to maintain an association between the aggregate action component code and first metadata identifying the configured code for each configured action of the plurality of configured action components; and create a process flow web component object in the database to maintain a second association between the process flow code and second metadata identifying the sequence of configured components within the process flow builder GUI display.

10. The non-transitory machine-readable storage medium of claim 9, wherein the instructions are configurable to cause said processor to update code for the web page to include a second reference to the process flow web component object in the database.

11. The non-transitory machine-readable storage medium of claim 10, wherein the instructions are configurable to cause said processor to identify a user configuration of a GUI element on the process flow builder GUI display corresponding to a GUI display behavior for the aggregate action component, wherein the aggregate action component code is configurable to cause the browser application to dynamically update a web page GUI display for the web page by invoking a subsequent configured component of the sequence of configured components without waiting for response data from any one of the plurality of configured action components.

12. The non-transitory machine-readable storage medium of claim 9, wherein the instructions are configurable to cause said processor to:
  generate the configured code for performing a respective action with respect to a network address identified by the respective configuration of the respective configured action for each configured action of the plurality of configured action components; and
  create a respective configured action web component object in the database to maintain the configured code for each configured action of the plurality of configured action components, wherein the first metadata comprises a respective reference to the respective configured action web component object for each configured action of the plurality of configured action components.

13. The non-transitory machine-readable storage medium of claim 9, wherein the instructions are configurable to cause said processor to identify a user configuration of a GUI element on the process flow builder GUI display corresponding to an error handling for the aggregate action component, wherein the aggregate action component code is configurable to cause the browser application to respond to an error generated by at least one of the plurality of configured action components in accordance with the user configuration of the GUI element.

14. The non-transitory machine-readable storage medium of claim 13, wherein the aggregate action component code comprises behavioral code configurable to cause the browser application to update at least a portion a web page GUI display for the web page in response to response data returned by one or more actions of the plurality of configured action components when the user configuration of the GUI element enables the response data to be applied when the error is generated.

15. The non-transitory machine-readable storage medium of claim 9, wherein the instructions are configurable to cause said processor to identify a user configuration of a GUI element on the process flow builder GUI display corresponding to a GUI display behavior for the aggregate action component, wherein the aggregate action component code is configurable to cause the browser application to dynamically update a web page GUI display for the web page in response to data returned by at least one of the plurality of configured action components in accordance with the user configuration of the GUI element.

16. The non-transitory machine-readable storage medium of claim 15, wherein the aggregate action component code comprises behavioral code configurable to cause the browser application to asynchronously update the web page GUI display for the web page in response to respective response data returned by each respective action of the plurality of configured action components when the user configuration of the GUI element corresponds to a non-blocking mode.

17. A system comprising:
  a non-transitory machine-readable storage medium that stores software; and
  a processor, coupled to the non-transitory machine-readable storage medium, to execute the software that implements a visual process design service and that is configurable to:
    identify a plurality of configured actions added to a region on a graphical user interface (GUI) display at a client device corresponding to an aggregate action component;
    automatically generate configured code for each configured action of the plurality of configured actions in accordance with a respective configuration of the respective configured action of the plurality of configured actions;
    identify a configuration associated with the aggregate action component;
    automatically generate aggregate action component code for a browser application initiating the configured code for each configured action of the plurality of configured actions in parallel in accordance with the configuration associated with the aggregate action component;
    automatically generate process flow code including a first reference to the aggregate action component code in accordance with a sequence defined for a web page
    create an aggregate action web component object in a database to maintain an association between the aggregate action component code and first metadata identifying the configured code for each configured action of the plurality of configured actions;
    create a process flow web component object in the database to maintain a second association between the process flow code and second metadata identifying a sequence of configured components within the GUI display; and
    updating code for the web page to include a second reference to the process flow web component object in the database, wherein:
      the sequence of configured components includes the aggregate action component; and
      the second metadata includes the first reference to the aggregate action web component object in accordance with the sequence.

* * * * *